(12) United States Patent
Shichino

(10) Patent No.: US 12,395,013 B2
(45) Date of Patent: Aug. 19, 2025

(54) POWER TRANSMISSION APPARATUS, POWER RECEPTION APPARATUS, METHOD, AND STORAGE MEDIUM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/606,325

(22) Filed: Mar. 15, 2024

(65) Prior Publication Data

US 2024/0223015 A1    Jul. 4, 2024

Related U.S. Application Data

(63) Continuation of application No. PCT/JP2022/033053, filed on Sep. 2, 2022.

(30) Foreign Application Priority Data

Sep. 17, 2021 (JP) ................ 2021-152002

(51) Int. Cl.
  *H02J 50/12* (2016.01)
  *B60L 53/124* (2019.01)
  *H02J 7/00* (2006.01)
  *H02J 50/60* (2016.01)
  *H02J 50/80* (2016.01)

(52) U.S. Cl.
  CPC ............ *H02J 50/12* (2016.02); *H02J 7/0048* (2020.01); *H02J 7/0063* (2013.01); *H02J 50/60* (2016.02); *H02J 50/80* (2016.02); *B60L 53/124* (2019.02)

(58) Field of Classification Search
  CPC ........ H02J 50/12; H02J 7/0048; H02J 7/0063; H02J 50/60; H02J 50/80; B60L 53/124
  See application file for complete search history.

(56) References Cited

U.S. PATENT DOCUMENTS

| | | | |
|---|---|---|---|
| 2013/0162054 A1* | 6/2013 | Komiyama | G01V 3/10 |
| | | | 702/60 |
| 2015/0285926 A1* | 10/2015 | Oettinger | H02J 50/70 |
| | | | 307/104 |
| 2017/0093214 A1* | 3/2017 | Watanabe | H02J 50/60 |
| 2019/0326787 A1* | 10/2019 | Kondo | G01V 3/10 |

(Continued)

FOREIGN PATENT DOCUMENTS

| | | |
|---|---|---|
| JP | 2017022999 A | 1/2017 |
| JP | 2017034972 A | 2/2017 |

(Continued)

*Primary Examiner* — Jared Fureman
*Assistant Examiner* — Michael J Warmflash
(74) *Attorney, Agent, or Firm* — Canon U.S.A., Inc. IP Division

(57) ABSTRACT

A power transmission apparatus transmits, to a power reception apparatus, if a change in the electrical characteristic during a stop of wireless power transmission is monotonically decreasing, a notification indicating whether to use a received power value to detect a foreign object based on a Q factor, and transmits, to a power reception apparatus, if the change in the electrical characteristic during the stop of wireless power transmission is not monotonically decreasing, a notification indicating that whether to use the received power value to detect the foreign object is not determined.

20 Claims, 16 Drawing Sheets

(56) References Cited

U.S. PATENT DOCUMENTS

| | | | | |
|---|---|---|---|---|
| 2022/0385114 A1* | 12/2022 | Shimura | ................ | H02J 50/12 |
| 2022/0385117 A1* | 12/2022 | Moritomo | ................ | H04B 5/48 |
| 2025/0112505 A1* | 4/2025 | Moritomo | ................ | H04B 5/48 |

FOREIGN PATENT DOCUMENTS

| | | | |
|---|---|---|---|
| JP | 2017070074 | A | 4/2017 |
| JP | 2020018166 | A | 1/2020 |
| JP | 2021129456 | A | 9/2021 |

* cited by examiner

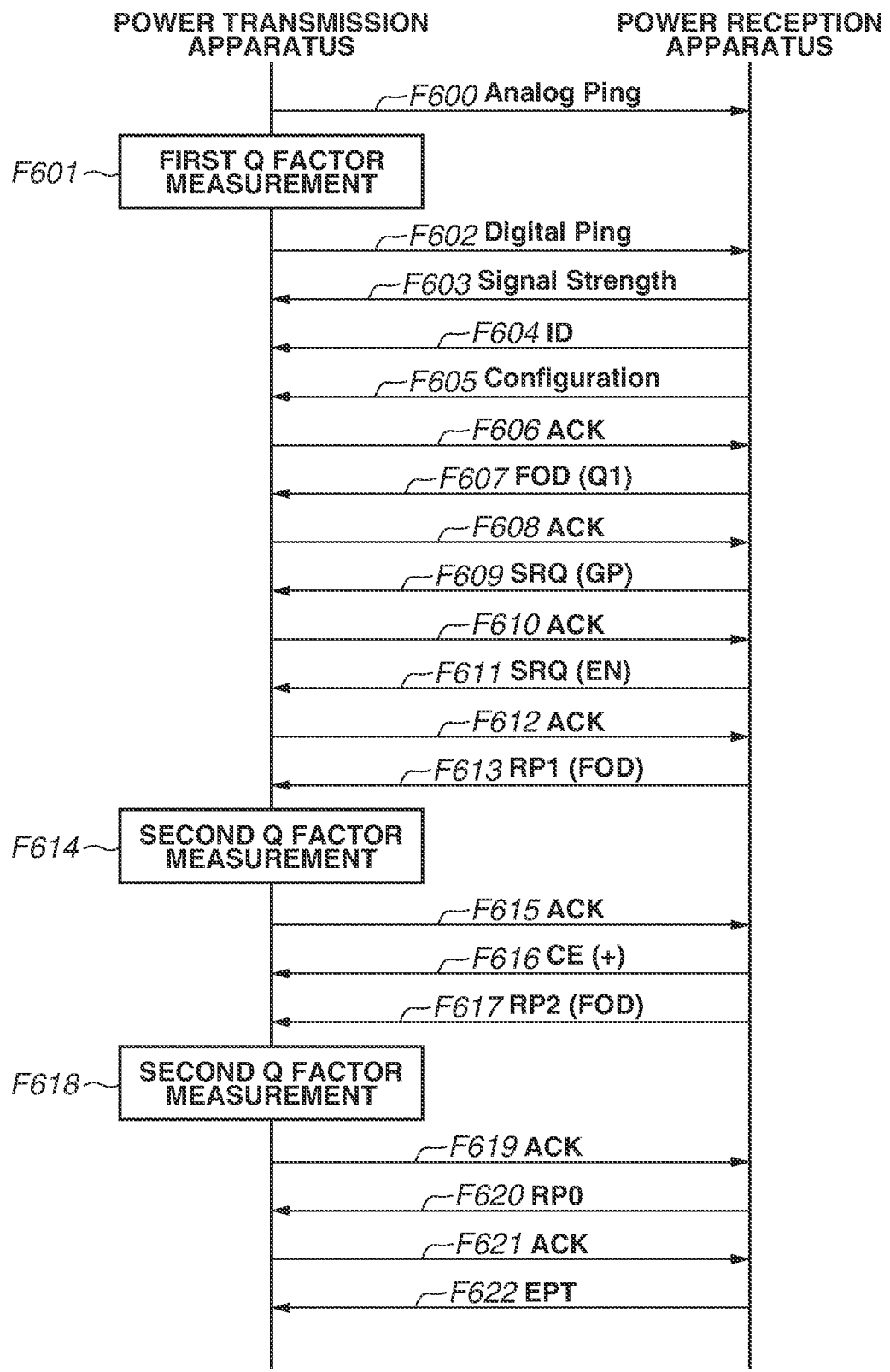

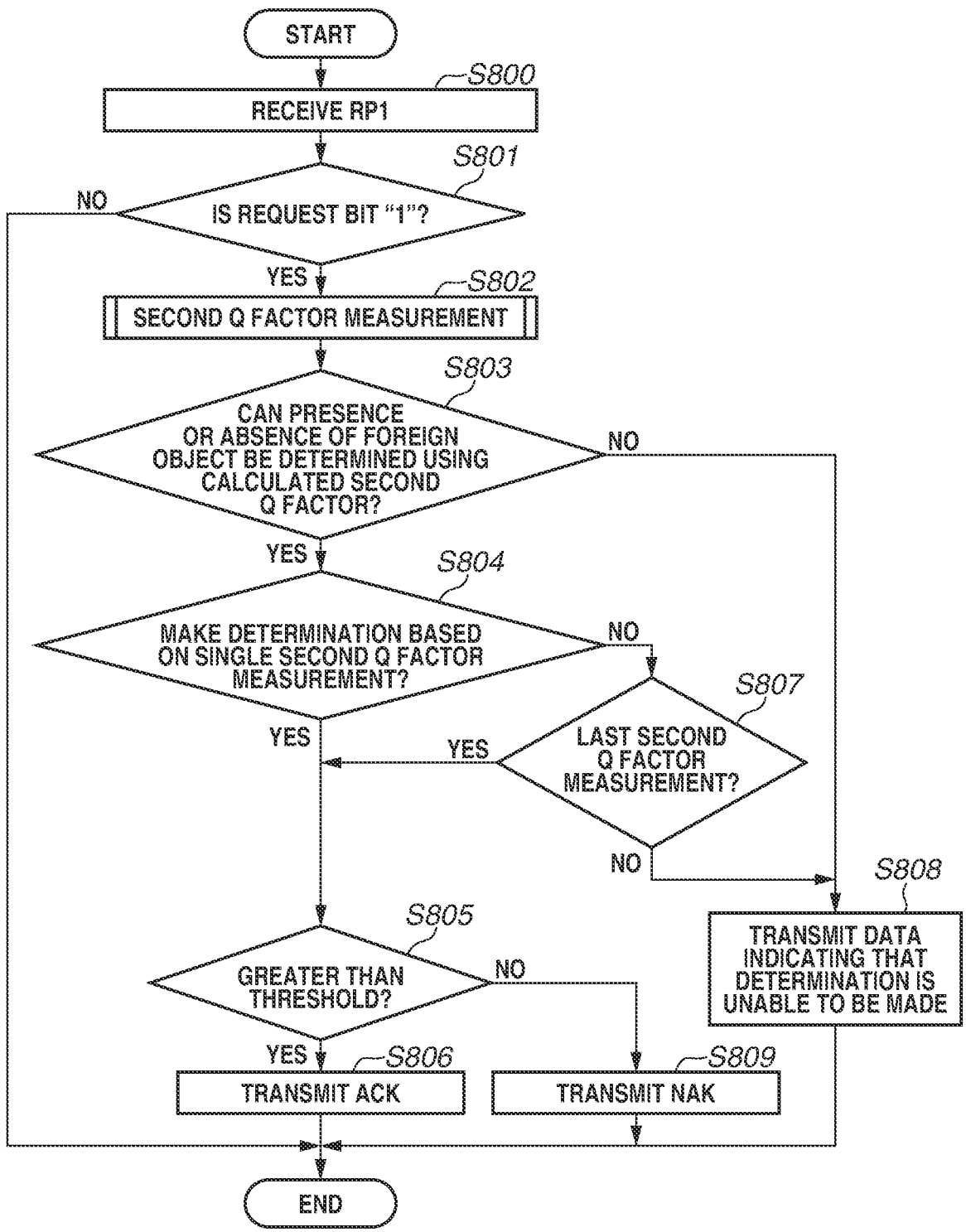

FIG.9

| 900 | 901 SECOND Q FACTOR IS LESS THAN THRESHOLD | 902 SECOND Q FACTOR IS GREATER THAN THRESHOLD | 903 PRESENCE OR ABSENCE OF FOREIGN OBJECT IS UNABLE TO BE DETERMINED USING SECOND Q FACTOR |
|---|---|---|---|
| $\|CEV\| \leq 2$ | NAK | ACK | UNABLE TO BE DETERMINED |
| $\|CEV\| > 2$ | NAK | NAK | NAK |

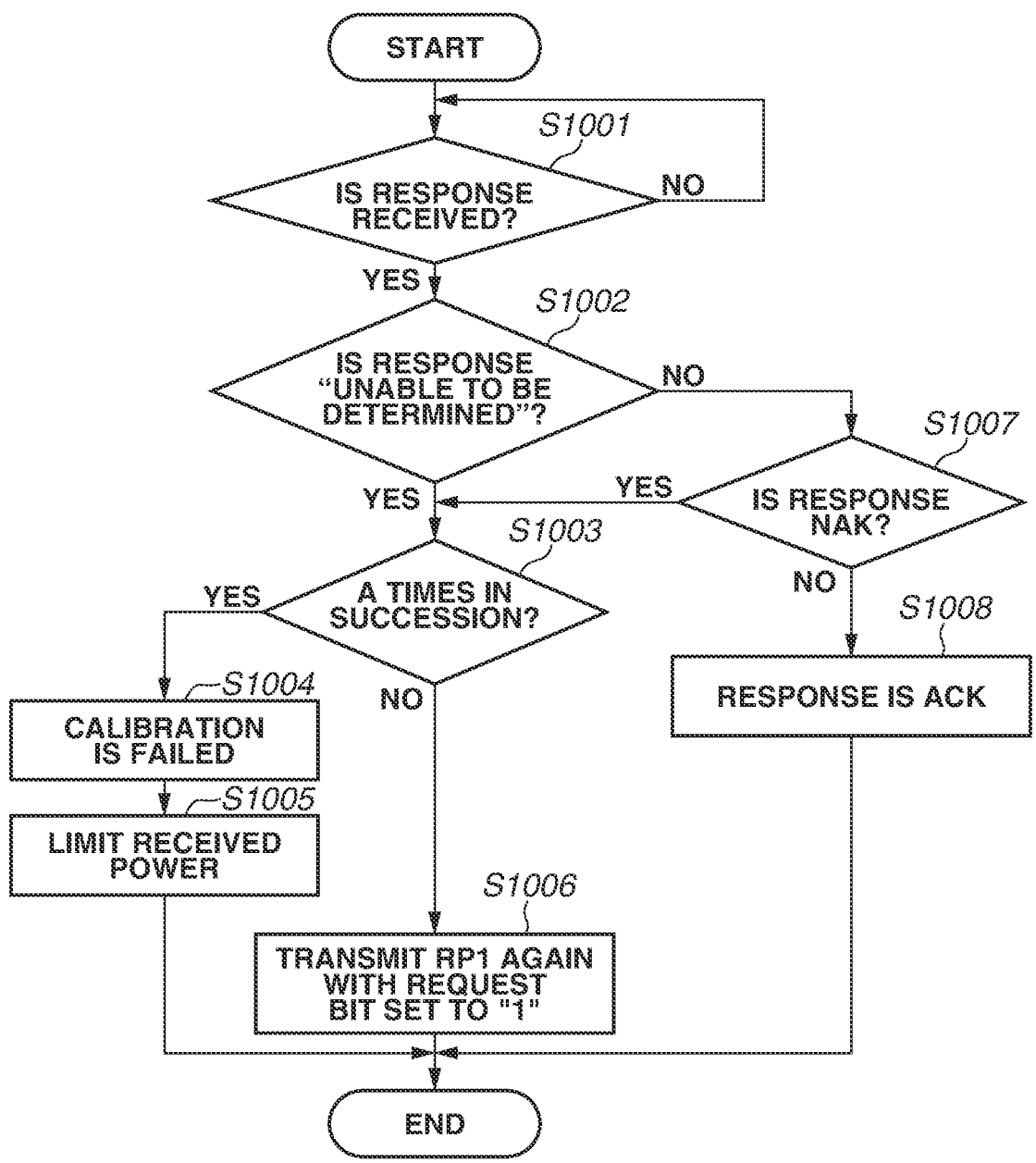

POWER TRANSMISSION APPARATUS, POWER RECEPTION APPARATUS, METHOD, AND STORAGE MEDIUM

CROSS-REFERENCE TO RELATED APPLICATIONS

This application is a Continuation of International Patent Application No. PCT/JP2022/033053, filed Sep. 2, 2022, which claims the benefit of Japanese Patent Application No. 2021-152002, filed Sep. 17, 2021, both of which are hereby incorporated by reference herein in their entireties.

BACKGROUND OF THE INVENTION

Field of the Invention

The present disclosure relates to a power transmission apparatus, a power reception apparatus, a control method, and a storage medium.

Background Art

Techniques for wireless power transfer systems are being widely developed, and a standard developed as a wireless charging standard by a standardization organization Wireless Power Consortium (WPC) is widely known (WPC standard). In such a wireless power transfer system, if there is an object (foreign object) different from a power reception apparatus within the coverage of power transmission by a power transmission apparatus, it is essential to detect the foreign object and control power transmission and reception.

PTL 1 discusses a technique for, if there is a foreign object near power transmission and reception apparatuses compliant with the WPC standard, detecting the foreign object and limiting power transmission and reception. PTL 2 discusses a technique for short-circuiting coils of a wireless power transfer system to detect a foreign object. PTL 3 discusses a technique for detecting a foreign object based on a change in a quality factor (Q factor) of a power transmission coil of a wireless power transfer system that is measured by applying a high-frequency signal to the power transmission coil for a specific period of time.

CITATION LIST

Patent Literature

PTL 1: Japanese Patent Application Laid-Open No. 2017-70074
PTL 2: Japanese Patent Application Laid-Open No. 2017-34972
PTL 3: Japanese Patent Application Laid-Open No. 2017-22999

SUMMARY OF THE INVENTION

The present disclosure is directed to enabling a power transmission apparatus to detect an object different from a power reception apparatus with high accuracy.

A power transmission apparatus wirelessly transmits power, receives a request to calculate a quality factor (Q factor) and a received power value from a power reception apparatus, stops a voltage applied to a power transmission coil, calculates the Q factor based on a change in an electrical characteristic of the power transmission coil over time during a stop. And the power transmission apparatus transmits, to the power reception apparatus, if the change in the electrical characteristic of the power transmission coil over time during the stop is monotonically decreasing, a notification indicating whether to use the received power value to detect a foreign object based on the calculated Q factor, and transmits, to the power reception apparatus, if the change in the electrical characteristic of the power transmission coil over time during the stop is not monotonically decreasing, a notification indicating that whether to use the received power value to detect the foreign object is not determined.

Further features of the present invention will become apparent from the following description of exemplary embodiments with reference to the attached drawings.

BRIEF DESCRIPTION OF THE DRAWINGS

FIG. 6 is a sequence diagram for describing an operation of the power transmission apparatus and the power reception apparatus.
FIG. 8A is a flowchart of third foreign object detection processing.
FIG. 9 is a diagram illustrating determinations of the third foreign object detection processing.
FIG. 10 is a flowchart for the power reception apparatus.

DESCRIPTION OF THE EMBODIMENTS

Figure 1:
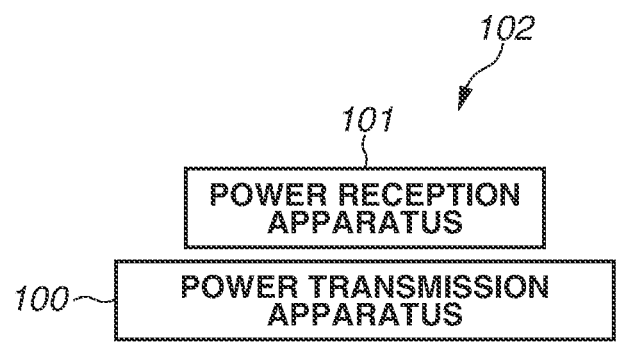
FIG. 1 is a diagram illustrating a configuration example of a wireless power transfer system.

Exemplary embodiments will be described below with reference to the drawings. It is noted that the following exemplary embodiments are not intended to limit the scope of the claims. While a plurality of features is described in the exemplary embodiments, all the plurality of features is not necessarily essential, and the features may be combined as appropriate. Further, in the drawings, the same or similar

First Exemplary Embodiment (System Configuration)

FIG. 1 is a diagram illustrating a configuration example of a wireless power transfer system 102 according to a first exemplary embodiment. The wireless power transfer system 102 includes a power transmission apparatus 100 and a power reception apparatus 101 in one example. The power transmission apparatus 100 and the power reception apparatus 101 are compliant with a Wireless Power Consortium (WPC) standard. The power transmission apparatus 100 is, for example, an electronic device that wirelessly transmits power to the power reception apparatus 101 placed on the power transmission apparatus 100. The power transmission apparatus 100 wirelessly transmits power to the power reception apparatus 101 via a power transmission coil. The power reception apparatus 101 is, for example, an electronic device that receives power from the power transmission apparatus 100 and charges a built-in battery. The power transmission apparatus 100 and the power reception apparatus 101 may be built in other apparatuses (camera, smartphone, tablet personal computer (PC), laptop, automobile, robot, medical device, and/or printer) and supply power to such apparatuses.

The power reception apparatus 101 and the power transmission apparatus 100 can have a function of executing an application other than a wireless charging application. An example of the power reception apparatus 101 is an information processing terminal such as a smartphone, and an example of the power transmission apparatus 100 is an accessory device for charging the information processing terminal. For example, the information processing terminal includes a display unit (display) that is supplied with power received from a power reception coil (antenna) and displays information to a user. The power received from the power reception coil is also stored in a power storage unit (battery), and the power is supplied from the battery to the display unit. In such a case, the power reception apparatus 101 may include a communication unit that communicates with another device different from the power transmission apparatus 100. The communication unit may support communication standards such as near-field communication (NFC) communication and the fifth generation mobile communication system (5G). In such a case, the communication unit may be powered by the battery and perform communication. The power reception apparatus 101 may be a tablet terminal, a storage device such as a hard disk device and a memory device, or an information processing apparatus such as a personal computer (PC). The power reception apparatus 101 may be an imaging apparatus (such as a camera and a video camera), for example. The power reception apparatus 101 may be an image input device such as a scanner, or an image output device such as a printer, a copying machine, and a projector. The power reception apparatus 101 may be a robot or a medical device. The power transmission apparatus 100 can be a device for charging the foregoing devices.

The power transmission apparatus 100 may be a smartphone. In such a case, the power reception apparatus 101 may be another smartphone or wireless earphones.

The power reception apparatus 101 according to the present exemplary embodiment may be a vehicle such as an automobile. For example, an automobile, which is the power reception apparatus 101, may receive power from a charger (power transmission apparatus 100) via a power transmission antenna installed in a parking lot. The automobile, which is the power reception apparatus 101, may receive power from the charger (power transmission apparatus 100) via a power transmission coil (antenna) buried in a road. Such an automobile supplies the received power to its battery. The power of the battery may be supplied to an engine unit (motor or motor drive unit) for driving wheels, or may be used to drive sensors used for driving assistance or drive a communication unit for communicating with an external device. That is, in such a case, the power reception apparatus 101 may include the wheels, the battery, the motor and sensors to be driven with the received power, and the communication unit for communicating with devices other than the power transmission apparatus 100. The power reception apparatuses 101 may further include an accommodation unit for accommodating people. Examples of the sensors include sensors used to measure distances to vehicles and other obstacles. The communication unit may support the Global Positioning System or Global Positioning Satellite (GPS), for example. The communication unit may also support communication standards such as the fifth generation mobile communication system (5G). Examples of the vehicle may include a bicycle and a motorcycle. The power reception apparatus 101 is not limited to a vehicle, and may be a moving body or flying body that includes an engine unit driven by power stored in a battery.

The power reception apparatus 101 according to the present exemplary embodiment may be a power tool or a home appliance. These devices, which are the power reception apparatus 101, may include a battery and a motor to be driven by the received power stored in the battery. These devices may include a notification unit that issues a notification of the remaining battery level. These devices may also include a communication unit that communicates with another device different from the power transmission apparatus 100. The communication unit may support communication standards such as NFC and the fifth generation mobile communication system (5G).

The power transmission apparatus 100 according to the present exemplary embodiment may be an in-vehicle charger that transmits power to a portable information terminal device such as a smartphone and a tablet supporting wireless power transfer in an automobile. Such an in-vehicle charger may be installed at any position inside the automobile. For example, the in-vehicle charger may be installed on the console of the automobile, on the instrument panel (dashboard), at a position between passenger seats, on the ceiling, or on a door. Installation at a location that may interfere with driving is, however, undesirable. While the description has been given of an example in which the power transmission apparatus 100 is an in-vehicle charger, such a charger is not limited to one installed in a vehicle, and may be installed in transport machinery such as a train, an aircraft, and a ship. In such a case, the charger may also be installed at a position between passenger seats, on the ceiling, or on a door.

A vehicle such as an automobile including an in-vehicle charger may be the power transmission apparatus 100. In such a case, the power transmission apparatus 100 includes wheels and a battery, and supplies power to the power reception apparatus 101 via a power transmission circuit unit and a power transmission coil (antenna) using the battery power.

(Device Configuration)

Figure 2:
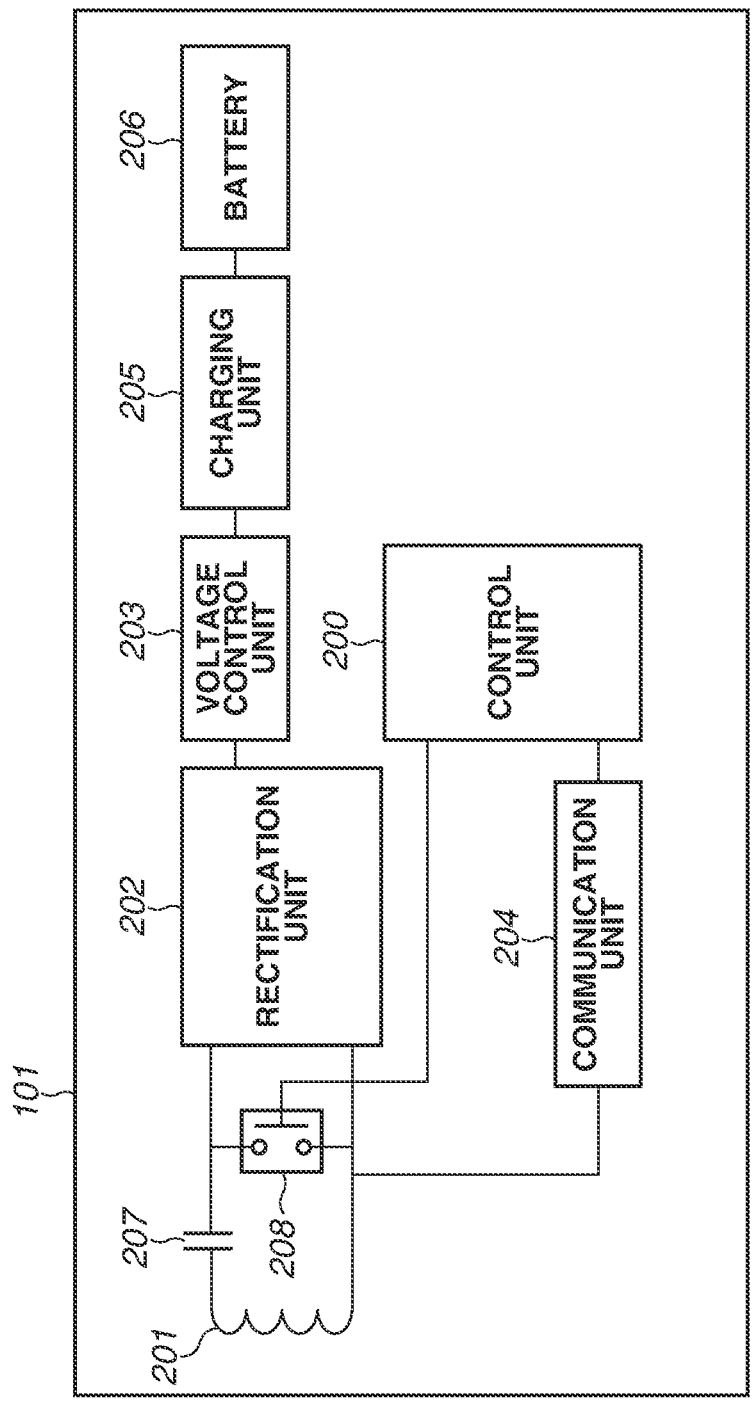
FIG. 2 is a diagram illustrating a hardware configuration example of a power reception apparatus.

FIG. 2 is a diagram illustrating a hardware configuration example of the power reception apparatus 101. For example, the power reception apparatus 101 includes a control unit 200, a power reception coil 201, a rectification unit 202, a voltage control unit 203, a communication unit 204, a charging unit 205, a battery 206, a resonant capacitor 207, and a switch 208.

The control unit 200 controls the entire power reception apparatus 101. The control unit 200 includes one or more processors such as a central processing unit (CPU) and a micro processing unit (MPU), for example. The control unit 200 may include one or more storage devices such as a random access memory (RAM) and a read-only memory (ROM), for example. The control unit 200 then performs processes to be described below by the processor(s) executing a program or programs stored in the storage device(s), for example.

The power reception coil 201 is a coil to be used in receiving power from a power transmission coil 303 (FIG. 3) of the power transmission apparatus 100. The rectification unit 202 converts an alternating-current voltage and an alternating current received via the power reception coil 201 into a direct-current voltage and a direct current, respectively. The voltage control unit 203 converts the level of the direct-current voltage input from the rectification unit 202 into a direct-current voltage level suitable (neither too high nor too low) for the control unit 200 and the charging unit 205 to operate. The voltage control unit 203 also supplies the voltage of the converted level to the charging unit 205. The charging unit 205 charges the battery 206 with the voltage supplied from the voltage control unit 203. The communication unit 204 performs wireless charging control communication with the power transmission apparatus 100 based on the WPC standard. This control communication is performed through load modulation of the alternating-current voltage and the alternating current received by the power reception coil 201.

The power reception coil 201 is connected to the resonant capacitor 207 and is configured to resonate at a specific frequency F2. The switch 208 is a switch for short-circuiting the power reception coil 201 and the resonant capacitor 207, and is controlled by the control unit 200. With the switch 208 on, the power reception coil 201 and the resonant capacitor 207 constitute a series resonant circuit. Here, a current only flows through the power reception coil 201, the resonant capacitor 207, and the closed circuit of the switch 208, and a current does not flow through the rectification unit 202 and the voltage control unit 203. By contrast, with the switch 208 off, a current flows through the rectification unit 202 and the voltage control unit 203 via the power reception coil 201 and the resonant capacitor 207.

Figure 3:
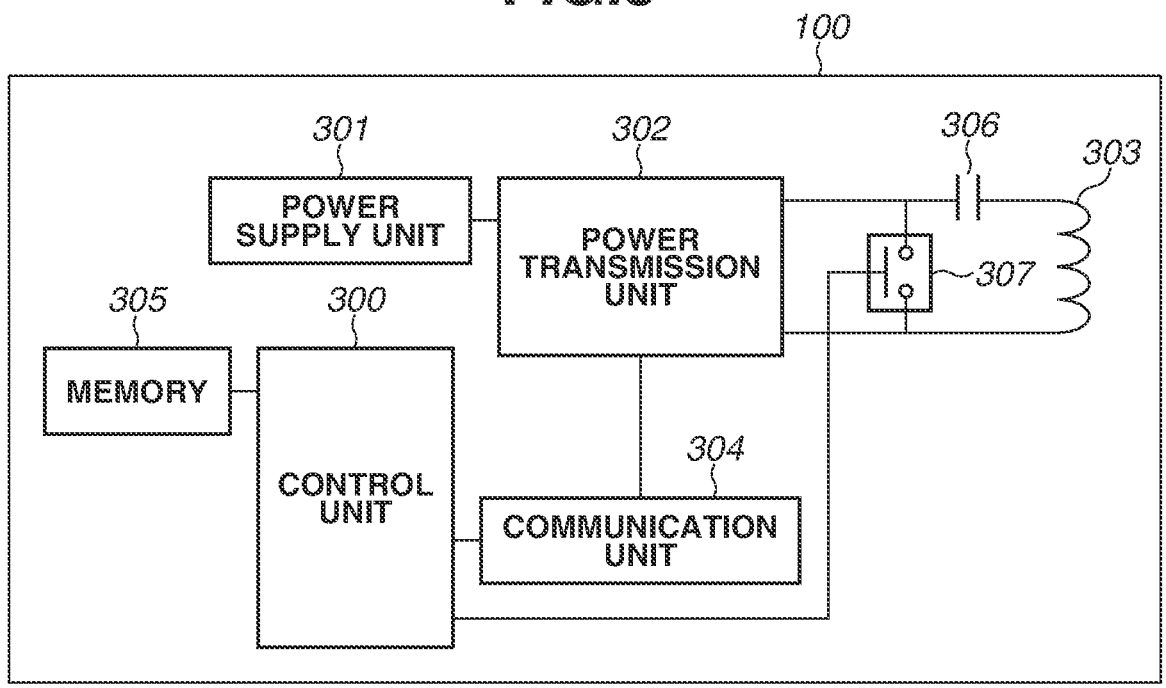
FIG. 3 is a diagram illustrating a hardware configuration example of a power transmission apparatus.

FIG. 3 is a diagram illustrating a hardware configuration example of the power transmission apparatus 100. For example, the power transmission apparatus 100 includes a control unit 300, a power supply unit 301, a power transmission unit 302, the power transmission coil 303, a communication unit 304, a memory 305, a resonant capacitor 306, and a switch 307.

The control unit 300 controls the entire power transmission apparatus 100. The control unit 300 includes one or more processors such as a CPU and an MPU, for example. The control unit 300 performs processes to be described below by the processor(s) executing a program or programs stored in the memory 305 to be described below and/or a storage device built in the control unit 300, for example. The power supply unit 301 supplies a power supply voltage to the components. The power supply unit 301 is a commercial power supply or a battery, for example. The battery stores power supplied from the commercial power supply, for example.

The power transmission unit 302 converts direct-current power or alternating-current power input from the power supply unit 301 into alternating-current power of a frequency band to be used for wireless power transfer, and inputs the alternating-current power to the power transmission coil 303. This causes the power transmission coil 303 to generate electromagnetic waves to allow the power reception apparatus 101 to receive power therefrom. For example, the power transmission unit 302 converts a direct-current voltage supplied from the power supply unit 301 into an alternating-current voltage via a half-bridge or full-bridge switching circuit using field effect transistors (FETs). In such a case, the power transmission unit 302 includes a gate driver for controlling the FETs to be on and off. The power transmission unit 302 controls the strength and frequency of the electromagnetic waves to be output by adjusting at least either one of the voltage (power transmission voltage) and the current (power transmission current) input to the power transmission coil 303 or the frequency. For example, the power transmission unit 302 increases the strength of the electromagnetic waves by increasing the power transmission voltage or the power transmission current, and reduces the strength of the electromagnetic waves by reducing the power transmission voltage or the power transmission current. Here, the power transmission unit 302 has the capability of supplying power to output at least 15 watts (W) of power to the charging unit 205 of the power reception apparatus 101 compliant with the WPC standard. The power transmission unit 302 also controls the output of the alternating-current power so that the output of the electromagnetic waves from the power transmission coil 303 is started or stopped based on instructions from the control unit 300.

The communication unit 304 performs communication for power transmission control based on the WPC standard with the power reception apparatus 101 via the power transmission coil 303. The communication unit 304 transmits information to the power reception apparatus 101 by modulating the alternating-current voltage and the alternating current to be output from the power transmission unit 302 using frequency shift keying (FSK). The communication unit 304 also obtains information transmitted from the power reception apparatus 101 by demodulating the alternating-current voltage and the alternating current load-modulated by the communication unit 204 of the power reception apparatus 101. In other words, the communication unit 304 superimposes the information to be transmitted to the power reception apparatus 101 on the electromagnetic waves transmitted from the power transmission unit 302, and communicates with the power reception apparatus 101 when the power reception apparatus 101 detects a reception signal superimposed on the electromagnetic waves. The communication unit 304 may communicate with the power reception apparatus 101 based on a standard different from the WPC standard, using a coil (or antenna) different from the power transmission coil 303. The communication unit 304 may communicate with the power reception apparatus 101 by selectively using a plurality of communication functions.

The memory 305 stores, for example, a control program to be executed by the control unit 300 and information about the states of the power transmission apparatus 100 and the power reception apparatus 101. For example, the state of the power transmission apparatus 100 is obtained by the control unit 300. The state of the power reception apparatus 101 is obtained by the control unit 200 of the power reception apparatus 101 and transmitted from the communication unit 204, and the power transmission apparatus 100 obtains the information indicating the state via the communication unit 304.

The power transmission coil 303 is connected to the resonant capacitor 306 and is configured to resonate at a specific frequency F1. The switch 307 is a switch for short-circuiting the power transmission coil 303 and the resonant capacitor 306, and is controlled by the control unit 300. With the switch 307 on, the power transmission coil 303 and the resonant capacitor 306 constitute a series resonant circuit. Here, a current only flows through the power transmission coil 303, the resonant capacitor 306, and the closed circuit of the switch 307. With the switch 307 off, the power transmission coil 303 and the resonant capacitor 306 are powered by the power transmission unit 302.

Figure 4:
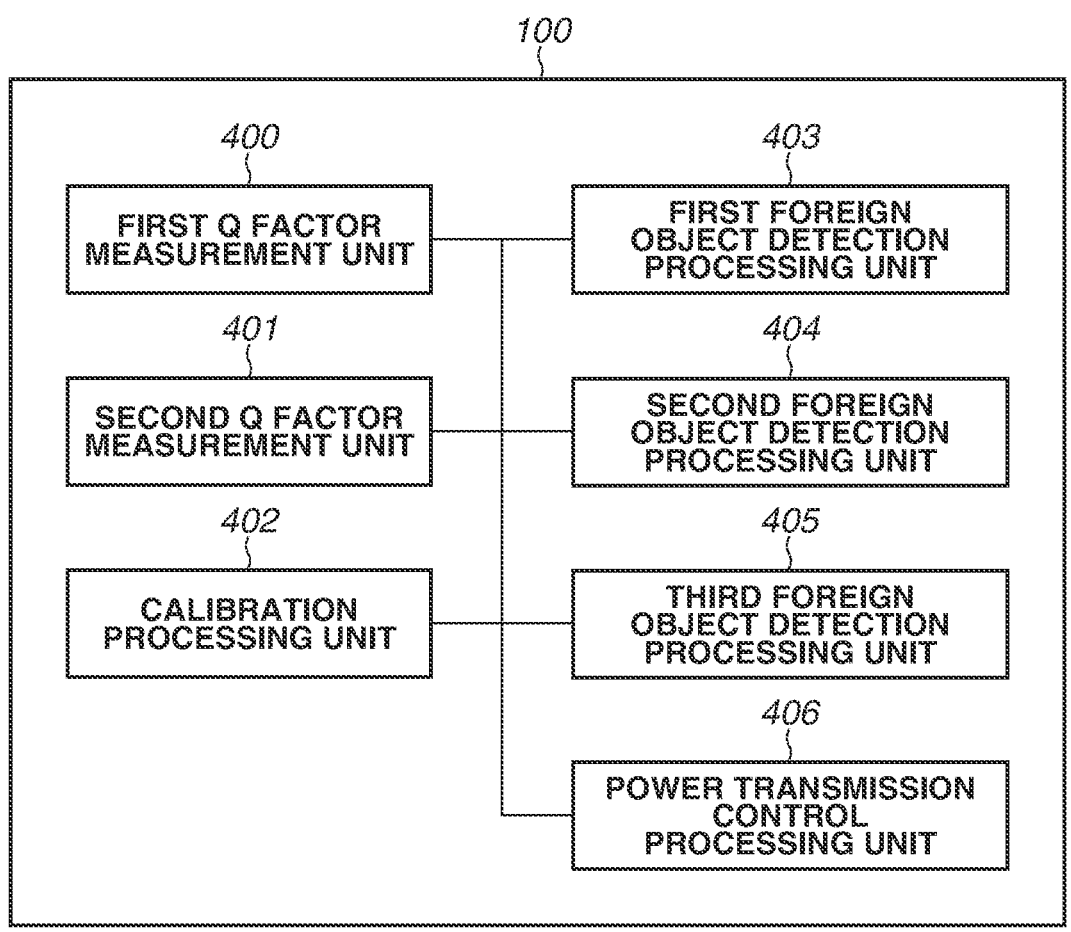
FIG. 4 is a diagram illustrating a functional configuration example of the power transmission apparatus.

FIG. 4 is a diagram illustrating a functional configuration example of the power transmission apparatus 100. The power transmission apparatus 100 operates as each functional unit when the control unit 300 executes programs. The power transmission apparatus 100 includes a first quality factor (Q factor) measurement unit 400, a second Q factor measurement unit 401, a calibration processing unit 402, a first foreign object detection processing unit 403, a second foreign object detection processing unit 404, a third foreign object detection processing unit 405, and a power transmission control processing unit 406. As employed in the present disclosure, examples of foreign objects include a piece of metal, a paper clip, and an integrated circuit (IC) card. Among those objects that are essential parts of the power reception apparatus, a product with the power reception apparatus built therein, the power transmission apparatus, and a product with the power transmission apparatus built therein, an object that can unintentionally generate heat when exposed to wireless power transmitted from the power transmission antenna is not considered to be a foreign object.

The first Q factor measurement unit 400 measures a Q factor in a frequency domain (first Q factor measurement) as will be described below. The second Q factor measurement unit 401 measures a Q factor in a time domain (second Q factor measurement) as will be described below. The calibration processing unit 402 performs processing for obtaining calibration data points and generating a calibration curve as will be described below. The first foreign object detection processing unit 403 performs foreign object detection processing based on a first Q factor measured by the first Q factor measurement unit 400 (first foreign object detection processing). The second foreign object detection processing unit 404 performs foreign object detection processing based on a power loss method to be described below (second foreign object detection processing). The third foreign object detection processing unit 405 performs foreign object detection processing based on a second Q factor measured by the second Q factor measurement unit 401 (third foreign object detection processing). The power transmission control processing unit 406 performs processing related to a start of power transmission, an end of power transmission, and an increase and decrease of transmitted power by the power transmission unit 302. The functional units illustrated in FIG. 4 are implemented using a plurality of respective independent programs, for example, and operate in parallel by synchronizing the plurality of programs through event handling and the like.

Figure 5:
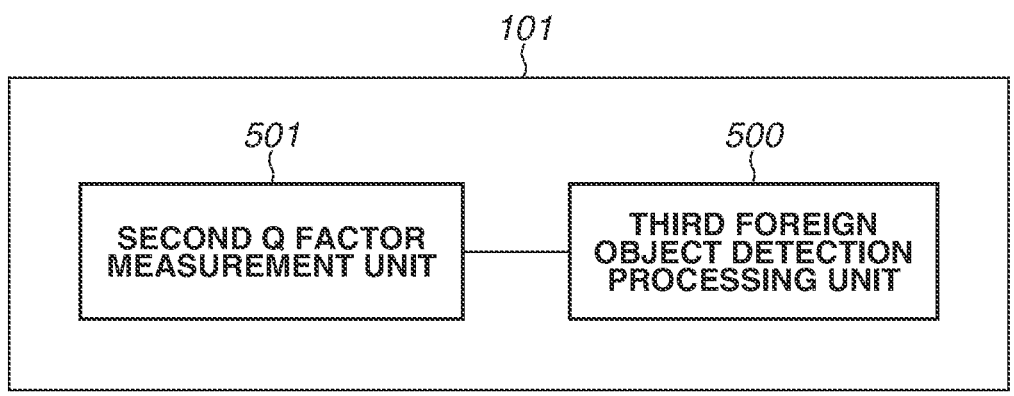
FIG. 5 is a diagram illustrating a functional configuration example of the power reception apparatus.

FIG. 5 is a diagram illustrating a functional configuration example of the power reception apparatus 101. The power reception apparatus 101 operates as each functional unit when the control unit 200 executes programs. The power reception apparatus 101 includes a second Q factor measurement unit 501 and a third foreign object detection processing unit 500.

The second Q factor measurement unit 501 measures a Q factor in a time domain (second Q factor measurement) as will be described below. The third foreign object detection processing unit 500 performs foreign object detection processing based on a second Q factor measured by the second Q factor measurement unit 501 (third foreign object detection processing). The functional units illustrated in FIG. 5 are implemented using respective independent programs, and operate in parallel by synchronizing the programs through event handling and the like.

(Foreign Object Detection Method According to WPC Standard)

Next, a foreign object detection method defined in the WPC standard will be described by using the power transmission apparatus 100 and the power reception apparatus 101. Here, a foreign object detection method based on a Q factor measured in a frequency domain (first foreign object detection method) and a foreign object detection method based on the power loss method (second foreign object detection method) will be described.

(1) Foreign Object Detection Method Based on Q Factor Measured in Frequency Domain (First Foreign Object Detection Method)

In the first foreign object detection method, the power transmission apparatus 100 initially measures the Q factor, which varies due to the influence of foreign objects, in the frequency domain (first Q factor measurement). This measurement is performed between when the power transmission apparatus 100 transmits an analog ping in step F600 of FIG. 6 and when the power transmission apparatus 100 transmits a digital ping in step F602 of FIG. 6 (see step F601 of FIG. 6). For example, to measure the Q factor, the power transmission unit 302 sweeps the frequency of the wireless power output by the power transmission coil 303, and the first Q factor measurement unit 400 measures the voltage value at the end of the resonant capacitor 306 connected in series (or in parallel) with the power transmission coil 303. The first Q factor measurement unit 400 then searches for a resonant frequency at which the voltage value peaks, and calculates the Q factor of the power transmission coil 303 from frequencies where the voltage value is 3 dB lower than the peak voltage value measured at the resonant frequency and the resonant frequency.

The first Q factor measurement unit 400 may measure the Q factor by a different method. For example, the power transmission unit 302 sweeps the frequency of the wireless power output by the power transmission coil 303, and the first Q factor measurement unit 400 measures the voltage value at the end of the resonant capacitor 306 connected in series with the power transmission coil 303 and searches for the resonant frequency at which the voltage value peaks. The first Q factor measurement unit 400 then measures the voltage values at both ends of the resonant capacitor 306 at the resonant frequency, and calculates the Q factor of the power transmission coil 303 from the ratio of the voltage values at both ends.

After the calculation of the Q factor of the power transmission coil 303, the first foreign object detection processing unit 403 of the power transmission apparatus 100 obtains a Q factor serving as a determination criterion for foreign object detection from the power reception apparatus 101 via the communication unit 304. For example, the first foreign object detection processing unit 403 receives, from the power reception apparatus 101, the Q factor (first characteristic value) of the power transmission coil in a case where the power reception apparatus is placed on a power transmission coil defined by the WPC standard. This Q factor is stored in a Foreign Object Detection (FOD) Status packet transmitted by the power reception apparatus 101, and the power transmission apparatus 100 obtains the Q factor by receiving the FOD Status packet. Based on the obtained Q factor, the first foreign object detection processing unit 403 estimates the Q factor of the power transmission coil 303 in a case where the power reception apparatus 101 is placed on the power transmission apparatus 100. In the present exemplary embodiment, the estimated Q factor will be referred to as a first reference Q factor. The Q factor to be stored in the FOD Status packet is stored in a nonvolatile memory (not illustrated) of the power reception apparatus 101 in advance. In other words, the power reception apparatus 101 notifies the power transmission apparatus 100 of the Q factor stored in advance. This Q factor corresponds to Q1 to be described below.

The first foreign object detection processing unit 403 of the power transmission apparatus 100 compares the first reference Q factor with the Q factor measured by the first Q factor measurement unit 400, and determines the presence or absence of a foreign object based on the comparison result. For example, the first foreign object detection processing unit 403 determines that there is highly likely to be a foreign object if the measured Q factor is lower than a threshold, and there is highly likely to be no foreign object if the measured Q factor is not lower than the threshold, when a Q factor that decreases by a % (first ratio) based on the first reference Q factor is defined as the threshold.

(2) Foreign Object Detection Method Based on Power Loss Method (Second Foreign Object Detection Method)

Figure 13:
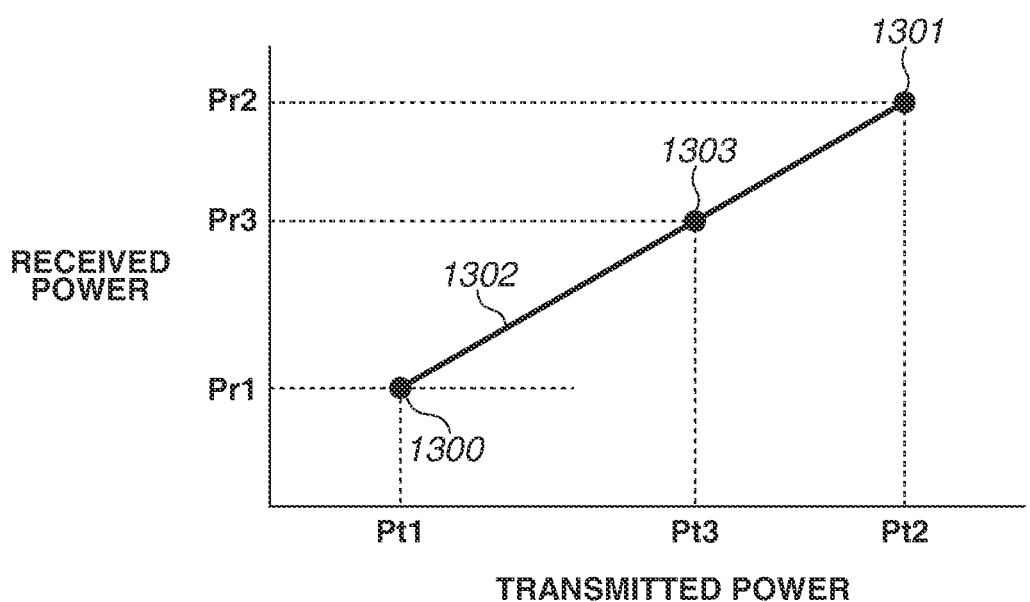
FIG. 13 is a diagram illustrating foreign object detection using a power loss method.

Next, a foreign object detection method based on the power loss method defined by the WPC standard will be described with reference to FIG. 13. FIG. 13 is an explanatory diagram of the foreign object detection using the power loss method, and the horizontal axis indicates the transmitted power value of the power transmission apparatus 100 and the vertical axis indicates the received power value of the power reception apparatus 101. The power transmitted by the power transmission unit 302 of the power transmission apparatus 100 is controlled by the power transmission control processing unit 406.

The power transmission unit 302 of the power transmission apparatus 100 initially transmits a digital ping to the power reception apparatus 101. The communication unit 304 of the power transmission apparatus 100 then receives a received power value Pr1 (referred to as a light load) at the power reception apparatus 101 using a Received Power Packet (mode 1). The Received Power Packet (mode 1) will hereinafter be referred to as an "RP1". The received power value Pr1 is the value of power received in a case where the power reception apparatus 101 does not supply the received power to a load (such as the charging unit 205 and the battery 206). The control unit 300 of the power transmission apparatus 100 stores, into the memory 305, the relationship between the received power value Pr1 received and a transmitted power value Pt1 when the received power value Pr1 is obtained (point 1300 in FIG. 13). The power transmission apparatus 100 can thus recognize that the amount of power loss between the power transmission apparatus 100 and the power reception apparatus 101 is Pt1−Pr1 (=Ploss1) when the power of the transmitted power value Pt1 is transmitted.

Next, the communication unit 304 of the power transmission apparatus 100 then receives, from the power reception apparatus 101, a received power value Pr2 (referred to as a connected load) at the power reception apparatus 101, using a Received Power Packet (mode 2). The Received Power Packet (mode 2) will hereinafter be referred to as an "RP2". The received power value Pr2 is the value of power received in a case where the power reception apparatus 101 supplies the received power to the load. The control unit 300 of the power transmission apparatus 100 then stores the relationship between the received power value Pr2 received and a transmitted power value Pt2 when the received power value Pr2 is obtained (point 1301 in FIG. 13) into the memory 305. The power transmission apparatus 100 can thus recognize that the amount of power loss between the power transmission apparatus 100 and the power reception apparatus 101 is Pt2−Pr2 (=Ploss2) when the power of the transmitted power value Pt2 is transmitted.

The calibration processing unit 402 of the power transmission apparatus 100 then linearly interpolates the points 1300 and 1301 and generates a line 1302. The line 1302 corresponds to the relationship between the transmitted power and the received power in a state where there is no foreign object near the power transmission apparatus 100 and the power reception apparatus 101. From the transmitted power value and the line 1302, the power transmission apparatus 100 can thus predict the received power value in a state where there is highly likely to be no foreign object. For example, as for a case of a transmitted power value Pt3, the power transmission apparatus 100 can predict a received power value Pr3 from a point 1303 corresponding to the transmitted power value Pt3 on the line 1302.

Here, suppose that, in a case where the power transmission unit 302 of the power transmission apparatus 100 transmits power at the transmitted power value Pt3 to the power reception apparatus 101, the communication unit 304 receives a received power value Pr3' from the power reception apparatus 101. The second foreign object detection processing unit 404 of the power transmission apparatus 100 calculates Pr3−Pr3' (=Ploss_FO) that is a value obtained by deducting the received power value Pr3' actually received from power reception apparatus 101 from the received power value Pr3 in a state where no foreign object is present. This Ploss_FO can be regarded as the amount of power loss consumed by a foreign object if the foreign object lies between the power transmission apparatus 100 and the power reception apparatus 101. The second foreign object detection processing unit 404 can thus determine that there is a foreign object if the power value Ploss_FO considered to be consumed by the foreign object exceeds a predetermined threshold. This threshold is derived based on the relationship between the points 1300 and 1301, for example.

The second foreign object detection processing unit 404 of the power transmission apparatus 100 obtains in advance the amount of power loss Pt3−Pr3 (Ploss3) between the power transmission apparatus 100 and the power reception apparatus 101, from the received power value Pr3 in a state where no foreign object is present. The second foreign object detection processing unit 404 then calculates the amount of power loss Pt3−Pr3' (=Ploss3') between the power transmission apparatus 100 and the power reception apparatus 101 in a state where a foreign object is present, or, from the received power value Pr3' received from the power reception apparatus 101 in a state where it is unknown whether there is a foreign object. The second foreign object detection processing unit 404 then calculates Ploss3'−Ploss3, and if the value exceeds the predetermined threshold, can determine that there is a foreign object. Here, Ploss3'−Ploss3=Pt3−Pr3'−Pt3+Pr3=Pr3−Pr3'. The second foreign object detection processing unit 404 can thus also estimate the power Ploss_FO predicted to have been consumed by the foreign object by comparing the amounts of power loss.

As described above, the value of the power Ploss_FO considered to have been consumed by the foreign object may be calculated as a difference in the received power, Pr3–Pr3', or as a difference in the power loss, Ploss3'–Ploss3 (=Ploss_FO).

After the line 1302 is obtained by the calibration processing unit 402, the second foreign object detection processing unit 404 of the power transmission apparatus 100 regularly receives the current received power value (for example, the foregoing received power value Pr3') from the power reception apparatus 101 via the communication unit 304. The current received power value that the power reception apparatus 101 regularly transmits is transmitted to the power transmission apparatus 100 as a Received Power Packet (mode 0). The second foreign object detection processing unit 404 of the power transmission apparatus 100 performs foreign object detection based on the received power value stored in the Received Power Packet (mode 0) and the line 1302. The Received Power Packet (mode 0) will hereinafter be referred to as an "RP0".

In the present exemplary embodiment, the points 1300 and 1301 for obtaining the line 1302 indicating the relationship between the transmitted power value and the received power value in the state where there is no foreign object near the power transmission apparatus 100 and the power reception apparatus 101 will be referred to as "calibration data points". The line segment (line 1302) obtained by the interpolation of at least two calibration data points will be referred to as a "calibration curve". The calibration data points and the calibration curve (second reference) are used for the foreign object detection processing by the second foreign object detection processing unit 404.

(Method for Measuring Q Factor in Time Domain)

Figure 11A:
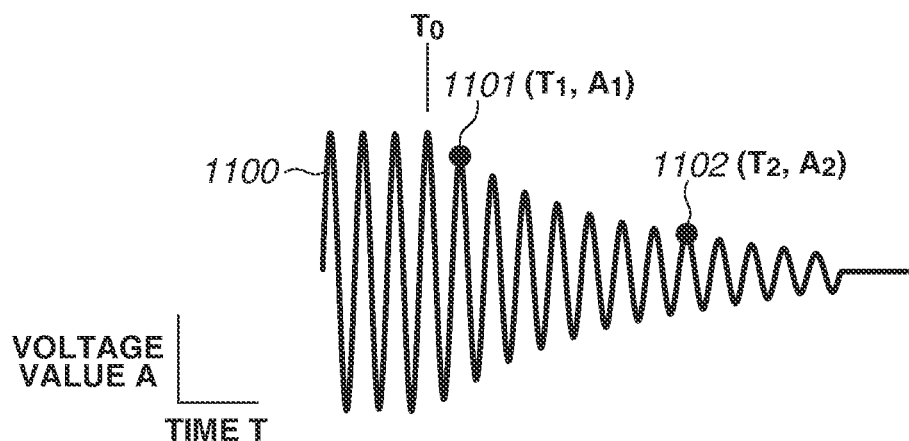
FIG. 11A is a diagram for describing a method for measuring a Q factor in a time domain.
Figure 11B:
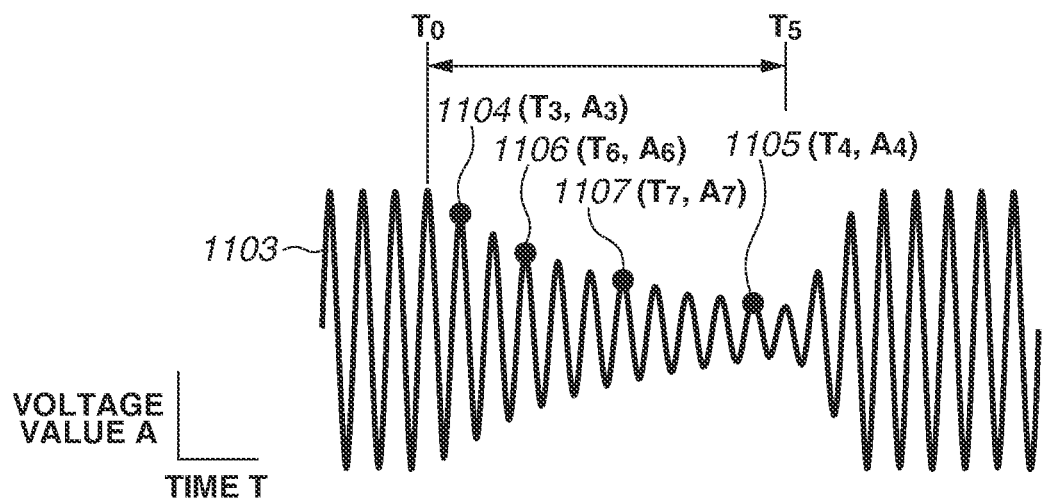
FIG. 11B is a diagram for describing a method for measuring a Q factor in a time domain.

A method for measuring the Q factor in the time domain will be described with reference to FIGS. 11A and 11B. FIGS. 11A and 11B are diagrams for describing the method for measuring the Q factor in the time domain (second Q factor measurement). In the present exemplary embodiment, the foreign object detection method based on the second Q factor will be referred to as a third foreign object detection method. The second Q factor measurement is performed by the second Q factor measurement unit 401. The power transmitted by the power transmission unit 302 of the power transmission apparatus 100 is controlled by the power transmission control processing unit 406. In the second Q factor measurement, the power transmission apparatus 100 and the power reception apparatus 101 turn on their switches in the same period of time to momentarily interrupt power transmission and stop delivering the received power to the load. As a result, the voltage applied to the coil decreases exponentially, for example. The second Q factors is calculated from the way in which the voltage decreases.

A waveform 1100 in FIG. 11A represents a variation of the value of the high-frequency voltage applied to the end of the power transmission coil 303 or the resonant capacitor 306 of the power transmission apparatus 100 (hereinafter, referred to simply as the "voltage value of the power transmission coil") over time. In FIGS. 11A and 11B, the horizontal axis indicates time, and the vertical axis indicates the voltage value. The application of the high-frequency voltage (power transmission) is stopped at time $T_0$. A point 1101 is a point on an envelope of the high-frequency voltage (in other words, a point of a maximum value), and represents the high-frequency voltage at time $T_1$. In FIG. 11A, $(T_1, A_1)$ indicates that the voltage value at time $T_1$ is $A_1$. Similarly, a point 1102 is a point on the envelope of the high-frequency voltage, and represents the high-frequency voltage at time $T_2$. In FIG. 11A, $(T_2, A_2)$ indicates that the voltage value at time $T_2$ is $A_2$.

The Q factor measurement is performed based on a change in the voltage value over time after time $T_0$. For example, based on the times and voltage values at the points 1101 and 1102 on the envelope of the voltage value and the frequency f of the high-frequency voltage (hereinafter, f will be referred to as an operating frequency), the Q factor is calculated by Eq. 1:

$$Q = \pi f \frac{T_2 - T_1}{\ln\left(\frac{A_1}{A_2}\right)}. \tag{Eq. 1}$$

In other words, the Q factor here represents an electrical characteristic determined by the relationship of the elapsed time of the power transmission coil 303 after the power transmission is limited (stopped) and the amount of voltage drop during the period.

Next, processing performed by the power transmission apparatus 100 to measure the Q factor in the time domain according to the present exemplary embodiment will be described with reference to FIG. 11B. A waveform 1103 represents the value of the high-frequency voltage applied to the power transmission coil 303, and the frequency is in the range of 110 kHz to 148.5 kHz used in the Qi standard. A point 1104, a point 1105, a point 1106, and a point 1107 are part of the envelope of the voltage value. The power transmission unit 302 of the power transmission apparatus 100 stops power transmission during the period from time $T_0$ to time $T_5$. The second Q factor measurement unit 401 of the power transmission apparatus 100 measures the Q factor based on a voltage value $A_3$ at time $T_3$ (point 1104), a voltage value $A_4$ at time $T_4$ (point 1105), the operating frequency of the high-frequency voltage, and Eq. 1. The power transmission unit 302 of the power transmission apparatus 100 resumes power transmission at time $T_5$. In such a manner, the second Q factor measurement is performed by the power transmission apparatus 100 momentarily interrupting the power transmission and measuring the Q factor based on the elapsed time, the voltage values, and the operating frequency. The power reception apparatus 101 similarly measures the value of the second Q factor as an electrical characteristic determined by the relationship between the elapsed time of the power reception coil 201 after the power transmission is limited (stopped) and the amount of voltage drop during the period.

(Typical Operation of Power Transmission Apparatus and Power Reception Apparatus)

FIG. 6 is a diagram illustrating operation in a case where the power transmission apparatus 100 and the power reception apparatus 101 compliant with the WPC standard perform the first foreign object detection processing, the second foreign object detection processing, and the third foreign object detection processing.

In step F600, the power transmission apparatus 100 transmits an analog ping to detect an object present near the power transmission coil 303. The analog ping is pulsed power for detecting an object. The analog ping is so weak power that the power reception apparatus 101 is unable to activate the control unit 200 even if receiving the analog ping. Using the analog ping, the power transmission apparatus 100 detects an object based on a shift in the resonant frequency of the voltage value inside the power transmission coil 303 due to the object present near the power transmission coil 303 and a change in the values of the voltage and the current flowing through the power transmission coil 303.

In step F601, the power transmission apparatus 100 detects an object using the analog ping, and measures the Q factor of the power transmission coil 303 by the foregoing first Q factor measurement. In step F602, the power transmission apparatus 100 starts transmitting a digital ping after the first Q factor measurement. The digital ping is power for activating the control unit 200 of the power reception apparatus 101 and higher than the analog ping. The digital ping is continuously transmitted thereafter. More specifically, the power transmission apparatus 100 continues transmitting power as high as or higher than the digital ping after the transmission of the digital ping is started in step F602 until an EPT packet to be described below is received from the power reception apparatus 101 in step F622. EPT is End Power Transfer.

In step F603, the power reception apparatus 101 receives the digital ping to start operating, stores the voltage value of the received digital ping into a Signal Strength packet, and transmits the Signal Strength packet to the power transmission apparatus 100. In step F604, the power reception apparatus 101 transmits, to the power transmission apparatus 100, an identifier (ID) packet storing an ID including version information about the WPC standard with which the power reception apparatus 101 is compliant and device identification information. In step F605, the power reception apparatus 101 further transmits, to the power transmission apparatus 100, a Configuration packet including information about the maximum value of power that the voltage control unit 203 supplies to the load (charging unit 205). The power transmission apparatus 100 receives the ID packet and the Configuration packet. In step F606, if the power reception apparatus 101 is determined to support an extended protocol of the WPC standard version 1.2 and later (including Negotiation to be described below) from the packets, the power transmission apparatus 100 responds an ACK (positive acknowledgement).

Upon receipt of the ACK, the power reception apparatus 101 transitions to a Negotiation phase for negotiating power to be transmitted and received. In step F607, the power reception apparatus 101 initially transmits an FOD Status packet to the power transmission apparatus 100. In the present exemplary embodiment, this FOD Status packet will be referred to as an "FOD(Q1)". The power transmission apparatus 100 performs foreign object detection using the first foreign object detection method based on a Q factor (first characteristic value) stored in the received FOD(Q1) and the Q factor measured by the first Q factor measurement. In step F608, if it is determined that there is highly likely to be no foreign object, the power transmission apparatus 100 transmits an ACK indicating the determination result to the power reception apparatus 101.

Upon receipt of the ACK, the power reception apparatus 101 negotiates Guaranteed Power (GP) that is the maximum value of power which the power reception apparatus 101 requests to receive. The Guaranteed Power indicates the load power of the power reception apparatus 101 (power consumption of the battery 206), which is agreed with the power transmission apparatus 100. This negotiation is implemented by the power reception apparatus 101 transmitting a packet storing the requested Guaranteed Power value to the power transmission apparatus 100 in step F609 among Specific Requests defined by the WPC standard. In the present exemplary embodiment, this packet will be referred to as an "SRQ(GP)". The power transmission apparatus 100 responds to the SRQ(GP) in consideration of the power transmission capability of the own apparatus.

In step F610, if the Guaranteed Power is determined to be acceptable, the power transmission apparatus 100 transmits an ACK indicating the acceptance of the request. In the present exemplary embodiment, it is assumed that the power reception apparatus 101 requests 15 W as the Guaranteed Power using the SRQ(GP).

In step F611, if negotiations on a plurality of parameters including the Guaranteed Power are ended, the power reception apparatus 101 transmits, to the power transmission apparatus 100, an "SRQ(EN)" that requests the end of the negotiation among the Specific Requests. The end of the negotiation is an End Negotiation. In step F612, the power transmission apparatus 100 transmits an ACK in response to the SRQ(EN), ends the negotiation, and transitions to a Power Transfer phase for transmitting and receiving power determined by the Guaranteed Power.

The power transmission apparatus 100 then generates a calibration curve for performing foreign object detection based on the foregoing power loss method (second foreign object detection method). In step F613, the power transmission apparatus 100 initially receives an RP1 from the power reception apparatus 101. This RP1 includes an information element by which the power reception apparatus 101 requests the power transmission apparatus 100 to perform the second Q factor measurement. For example, a 1-bit field indicating whether to request the second Q factor measurement in a reserved area of the Received Power Packet is provided. The power reception apparatus 101 stores "1" into the bit if the second Q factor measurement is requested, and "0" if the second Q factor measurement is not requested. In the present exemplary embodiment, this bit will be referred to as a "request bit". In the present exemplary embodiment, the RP1 with "1" stored in the request bit is referred to as an RP1(FOD).

In step F614, the power transmission apparatus 100, upon receipt of the RP1(FOD), performs the second Q factor measurement according to the procedure described above, and performs the third foreign object detection processing. Here, the response to the RP1(FOD) is determined based on two factors. One is the result of the third foreign object detection processing. The other is a Control Error Packet (hereinafter, referred to as a CE) by which the power reception apparatus 101 requests the power transmission apparatus 100 to increase or decrease the received voltage (or received current or received power). The CE stores an integer with a positive sign if an increase in the received voltage is requested, an integer with a negative sign if a decrease in the received voltage is requested, and "0" if the current received voltage is to be maintained. The power transmission apparatus 100 promptly performs power transmission control based on the sign and integer stored in the CE. Specifically, the power transmission apparatus 100 promptly increases the transmitted voltage if an integer with a positive sign is stored, promptly decreases the transmitted voltage if an integer with a negative sign is stored, and maintains the transmitted voltage if "0" is stored.

In step F615, the power transmission apparatus 100 determines to accept the received power value stored in the RP1(FOD) and the transmitted power value of the power transmission apparatus 100 when the received power is obtained as a calibration data point (corresponding to the point 1300 in FIG. 13). The power transmission apparatus 100 then transmits an ACK to the power reception apparatus 101.

In step F616, the power reception apparatus 101 transmits a CE(+) indicating an increase in power to the power transmission apparatus 100. Upon receipt of the CE(+), the power transmission apparatus 100 changes the setting value of the power transmission unit 302 to increase the transmitted power. When the received power increases in response to the CE(+), the power reception apparatus 101 supplies the received power to the load (charging unit 205 and battery 206).

In step F617, the power reception apparatus 101 transmits an RP2(FOD) with "1" stored in the request bit to the power transmission apparatus 100. In step F618, upon receipt of the RP2(FOD), the power transmission apparatus 100 performs the second Q factor measurement and performs the third foreign object detection processing. In step F619, the power transmission apparatus 100 determines to accept the received power value stored in the RP2(FOD) and the transmitted power value of the power transmission apparatus 100 when the received power is obtained as a calibration data point (corresponding to the point 1301 in FIG. 13). The power transmission apparatus 100 then transmits an ACK to the power reception apparatus 101.

In step F620, the power reception apparatus 101 transmits the RP0 to the power transmission apparatus 100. Upon receipt of the RP0, the power transmission apparatus 100 performs foreign object detection based on the foregoing second foreign object detection method. In step F621, if it is determined that there is highly likely to be no foreign object as a result of the foreign object detection, the power transmission apparatus 100 transmits an ACK to the power reception apparatus 101. In step F622, the power reception apparatus 101 transmits an EPT packet that requests to stop power transmission to the power transmission apparatus 100 when the charging of the battery 206 ends.

In such a manner, the power transmission apparatus 100 and the power reception apparatus 101 perform wireless power transfer therebetween based on the first foreign object detection processing, the second foreign object detection processing, and the third foreign object detection processing.

(Challenge of Present Exemplary Embodiment)

Figure 11C:
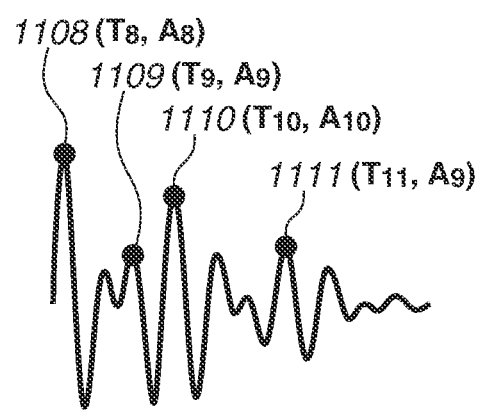
FIG. 11C is a diagram for describing a method for measuring a Q factor in a time domain.

Suppose that the voltage waveforms of the power transmission coil 303 and the power reception coil 201 in performing the second Q factor measurement are as illustrated in FIG. 11C. FIG. 11C illustrates a case where the voltage amplitude of the power transmission coil 303 during the momentary interruption is not monotonically decreasing. Here, when it is assumed that the absolute value of the amplitude (maximum value) of the voltage waveform at time $T_a$ is $A_a$, and the absolute value of the amplitude (maximum value) at time $T_b$ is $A_b$, in the present exemplary embodiment, the voltage is expressed as monotonically decreasing if there holds the relationship "if time $T_a<T_b$, then the amplitude $A_a>A_b$".

As for a point 1109 and a point 1110 in FIG. 11C, there holds time $T_9<T_{10}$ but not the amplitude $A_9>A_{10}$, so that the voltage waveform of FIG. 11C is not monotonically decreasing. Suppose that the Q factor is calculated for the point 1109 ($T_9$, $A_9$) and the point 1110 ($T_{10}$, $A_{10}$) based on Eq. 1. Since $T_9<T_{10}$, the sign of the numerator is positive. On the other hand, since $A_9<A_{10}$ in FIG. 11C, the sign of the denominator of Eq. 1 is negative and the sign of the Q factor is thus negative. This contradicts the definition of the Q factor since the sign of the Q factor is originally a positive sign. This means that the Q factor is not able to be measured in the first place unless the waveform is monotonically decreasing. Moreover, if the waveform is not monotonically decreasing, maximum points at different times can have the same value. For example, the points 1109 and 1111 have the same amplitude $A_9$. Here, the Q factor calculated using the points 1108 and 1109 and the Q factor calculated using the points 1108 and 1111 have the same denominator in Eq. 1 but have different numerators. This means that if the waveform is not monotonically decreasing, the calculated Q factor varies depending on which maximum points are used as the measurement points. In other words, if the voltage waveform is not monotonically decreasing, the Q factor (second Q factor) is unable to be calculated with high accuracy, and the third foreign object detection for determining the presence or absence of a foreign object based on the second Q factor is unable to be performed with high accuracy.

(Description of Operation of Second Q Factor Measurement Unit)

Figure 7A:
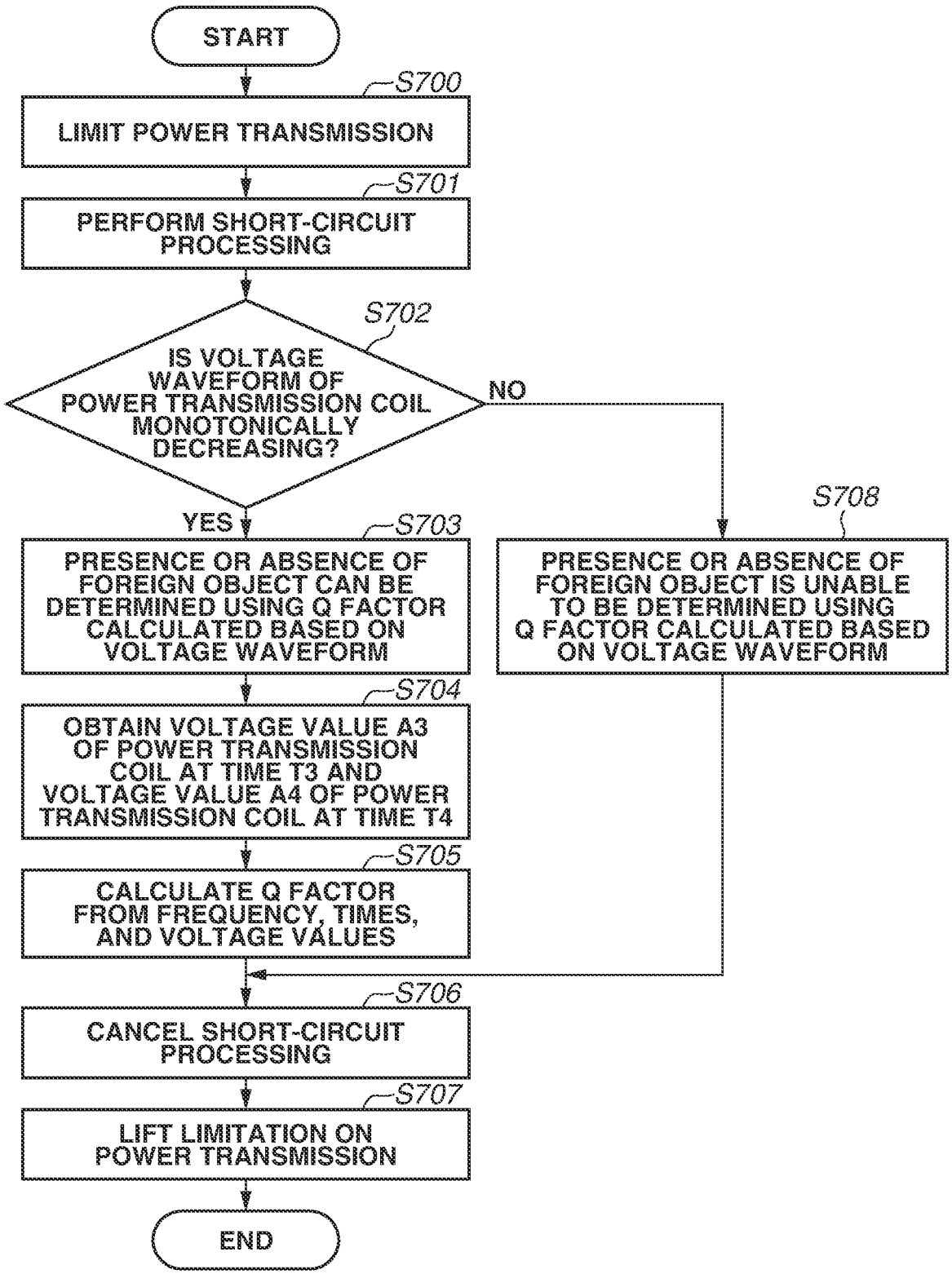
FIG. 7A is a flowchart of second Q factor measurement processing.

FIG. 7A is a flowchart illustrating processing that the second Q factor measurement unit 401 according to the present exemplary embodiment performs to address the challenge that the third foreign object detection is unable to be performed with high accuracy.

In step S700, the second Q factor measurement unit 401 limits the power transmission of the power transmission unit 302. In step S701, the second Q factor measurement unit 401 turns on the switch 307 for short-circuiting the power transmission coil 303 and the resonant capacitor 306 to perform short-circuit processing.

In step S702, the second Q factor measurement unit 401 determines whether the voltage waveform of the power transmission coil 303 is monotonically decreasing. FIG. 11C illustrates the voltage waveform in this case. Since the voltage waveform of FIG. 11C is not monotonically decreasing (NO in step S702), the processing of the second Q factor measurement unit 401 proceeds to step S708.

In step S708, the second Q factor measurement unit 401 determines that the presence or absence of a foreign object is unable to be determined using the second Q factor calculated based on the voltage waveform. In step S706, the second Q factor measurement unit 401 turns off the switch 307 to cancel the short-circuit processing. In step S707, the second Q factor measurement unit 401 then lifts the limitation on the power transmission of the power transmission unit 302.

Suppose that, in step S702, the voltage waveform of the power transmission coil 303 is monotonically decreasing as illustrated in FIG. 11B, for example. In such a case, since the voltage waveform of the power transmission coil 303 is monotonically decreasing (YES in step S702), the processing of the second Q factor measurement unit 401 proceeds to step S703.

In step S703, the second Q factor measurement unit 401 determines that the presence or absence of a foreign object can be determined using the second Q factor calculated based on the voltage waveform. In step S704, the second Q factor measurement unit 401 obtains the voltage value $A_3$ of the power transmission coil 303 at time $T_3$ and the voltage value $A_4$ at time $T_4$, for example. In step S705, the second Q factor measurement unit 401 calculates the second Q factor from the frequency, the times, and the voltage values based on Eq. 1.

In step S706, the second Q factor measurement unit 401 then turns off the switch 307 to cancel the short-circuit processing. In step S707, the second Q factor measurement unit 401 lifts the limitation on the power transmission of the power transmission unit 302.

In such a manner, the second Q factor measurement unit 401 determines whether the presence or absence of a foreign object can be determined using the second Q factor, based on the voltage waveform of the power transmission coil 303.

(Description of Operation of Third Foreign Object Detection Processing Unit)

FIG. 8A is a flowchart illustrating the processing performed by the third foreign object detection processing unit 405 based on the determination made by the second Q factor measurement unit 401 in FIG. 7A. A method for controlling the power transmission apparatus 100 will now be described.

In step S800, the third foreign object detection processing unit 405 receives the RP1 from the power reception apparatus 101.

In step S801, if the request bit included in the RP1 is "0" (NO in step S801), the processing in the flowchart of FIG. 8A ends, and the third foreign object detection processing unit 405 waits for the reception of the RP1 in the next step S800. If the request bit included in the RP1 is "1" (YES in step S801), the processing of the third foreign object detection processing unit 405 proceeds to step S802. In step S802, the second Q factor measurement unit 401 performs the processing in the flowchart of FIG. 7A (second Q factor measurement).

In step S803, the third foreign object detection processing unit 405 determines, based on FIG. 7A, whether the presence or absence of a foreign object can be determined using the second Q factor calculated based on the voltage waveform. If the voltage waveform of the power transmission coil 303 is not monotonically decreasing, the calculated second Q factor can be inaccurate, and thus the third foreign object detection processing unit 405 thus determines that the presence or absence of a foreign object is unable to be determined using the calculated second Q factor (NO in step S803), and the processing proceeds to step S808.

If the voltage waveform of the power transmission coil 303 is monotonically decreasing, the calculated second Q factor is highly likely to be accurate, and thus third foreign object detection processing unit 405 determines that the presence or absence of a foreign object can be determined using the calculated second Q factor (YES in step S803), and the processing proceeds to step S804.

Possible methods for foreign object detection using the second Q factor include a method for determining the presence or absence of a foreign object using the result of a single second Q factor measurement and a method for performing the second Q factor measurement a plurality of times and making the determination using the results of the plurality of measurements.

In step S804, if the third foreign object detection processing unit 405 determines the presence or absence of a foreign object based on a single second Q factor measurement (YES in step S804), the processing proceeds to step S805. If the third foreign object detection processing unit 405 makes the determination based on the measurement results of a plurality of second Q factor measurements (NO in step S804), the processing proceeds to step S807.

In step S807, if the second Q factor measurement performed in step S802 is the last second Q factor measurement (YES in step S807, for example, the third one in a case where the determination is made based on three second Q factor measurements), the processing proceeds to step S805. If the second Q factor measurement performed in step S802 is not the last second Q factor measurement (NO in step S807), the processing proceeds to step S808 since the third foreign object detection processing unit 405 does not determine the presence or absence of a foreign object until the last second Q factor measurement is performed.

In step S808, the third foreign object detection processing unit 405 transmits data indicating that the presence or absence of a foreign object is unable to be determined, as a response to the RP1, the processing in the flowchart of FIG. 8A ends, and the third foreign object detection processing unit 405 waits for the reception of the RP1 in the next step S800.

In step S805, if the calculated second Q factor is greater than a threshold (YES in step S805), the processing proceeds to step S806, and if the calculated second Q factor is not greater than the threshold (NO in step S805), the processing proceeds to step S809.

In step S806, the third foreign object detection processing unit 405 transmits an ACK in response to the RP1, and the processing in the flowchart of FIG. 8A ends. In step S809, the third foreign object detection processing unit 405 transmits a NAK in response to the RP1, the processing in the flowchart of FIG. 8A ends, and the third foreign object detection processing unit 405 waits for the reception of the RP1 in the next step S800.

As described above, the power transmission apparatus 100 does not determine the presence or absence of a foreign object based on the second Q factor measurement if the second Q factor measurement can be inaccurate, depending on whether the voltage waveform of the power transmission coil 303 during the second Q factor measurement is monotonically decreasing. This provides the effect that the presence or absence of a foreign object can be determined with high accuracy.

(Description of Other Operations of Third Foreign Object Detection Processing Unit)

The determination made by the third foreign object detection processing unit 405 as to whether the presence or absence of a foreign object can be determined using the second Q factor may be made based on an additional condition about the magnitude of the integer (hereinafter, referred to as a Control Error Value (CEV)) included in the CE.

FIG. 9 is a chart for describing the condition. A condition 900 is the condition of the CEV. $|CEV| \leq 2$ means that the absolute value of the CEV is less than or equal to 2. This represents a state where the voltage value of the power transmission coil 303 is stable. On the other hand, $|CEV| > 2$ means that the absolute value of the CEV is greater than 2. This represents a state where the voltage value of the power transmission coil 303 is unstable since the power transmission unit 302 increases or decrease the transmitted voltage based on the CE. While FIG. 9 illustrates a case where the absolute value of the CEV is compared with 2, any given integer may be used. It will be understood that the value of the CEV may be compared with integers with positive and negative signs.

A condition 901 represents a case where the third foreign object detection processing unit 405 determines that the presence or absence of a foreign object can be determined using the second Q factor and the second Q factor is less than the threshold. A condition 902 represents a case where the third foreign object detection processing unit 405 determines that the presence or absence of a foreign object can be determined using the second Q factor and the second Q factor is greater than the threshold. A condition 903 represents a case where the third foreign object detection processing unit 405 determines that the presence or absence of a foreign object is unable to be determined using the second Q factor.

Consider the state where |CEV|≤2 and the voltage value of the power transmission coil 303 is stable in FIG. 9. The third foreign object detection processing unit 405 transmits a NAK in response to the RP1 if the second Q factor is less than the threshold, transmits an ACK in response to the RP1 if the second Q factor is greater than the threshold, and transmits data indicating that the presence or absence of a foreign object is unable to be determined if the presence or absence of a foreign object is unable to be determined using the second Q factor.

On the other hand, in the state where |CEV|>2 and the voltage value of the power transmission coil 303 is unstable, the third foreign object detection processing unit 405 transmits a NAK regardless of the other conditions. The reason is that the second Q factor measurement may be unable to be accurately performed with the voltage value unstable.

Figure 8B:
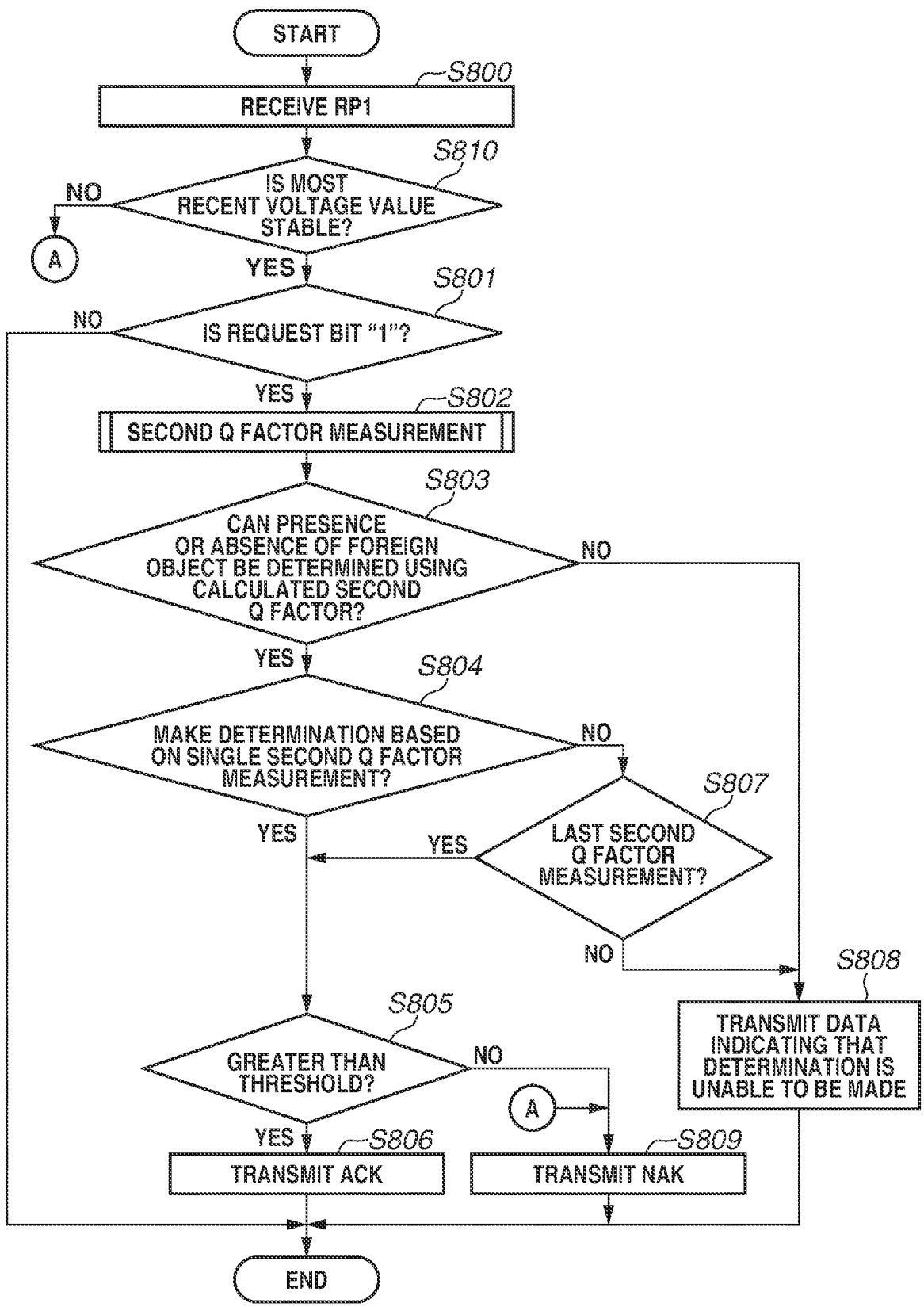
FIG. 8B is a flowchart of third foreign object detection processing.

FIG. 8B is a flowchart illustrating the processing performed by the third foreign object detection processing unit 405 with the determination in FIG. 9 taken into account. FIG. 8B includes step S810 in addition to the steps in FIG. 8A. After step S800, the processing of the third foreign object detection processing unit 405 proceeds to step S810.

In step S810, if the most recent voltage value of the power transmission coil 303 is unstable (NO in step S810), the processing proceeds to step S809. If the most recent voltage value of the power transmission coil 303 is stable (YES in step S810), the processing of the third foreign object detection processing unit 405 proceeds to step S802.

In step S809, the third foreign object detection processing unit 405 transmits a NAK in response to the RP1, the processing in the flowchart of FIG. 8 ends, and the third foreign object detection processing unit 405 waits for the reception of the RP1 in the next step S800. In step S802 and the subsequent steps, the third foreign object detection processing unit 405 performs processing similar to that in FIG. 8A.

The third foreign object detection processing unit 405 can thus make an accurate determination by transmitting a NAK in a case where the second Q factor calculated with the voltage value of the power transmission coil 303 unstable happens to be greater than the threshold.

(Description of Operation of Power Reception Apparatus 101)

FIG. 10 is a flowchart illustrating the processing in the power reception apparatus 101 in the case where the third foreign object detection processing unit 405 determines the presence or absence of a foreign object based on a single second Q factor measurement. A method for controlling the power reception apparatus 101 will now be described.

In step S1001, the power reception apparatus 101 waits until a response to any one of the RP1(FOD), RP2(FOD), and RP0(FOD) is received, and if a response is received (YES in step S1001), the processing proceeds to step S1002.

In step S1002, if the foregoing response is that "the presence or absence of a foreign object is unable to be determined using the second Q factor" (YES in step S1002), the processing of the power reception apparatus 101 proceeds to step S1003. If the foregoing response is not that "the presence or absence of a foreign object is unable to be determined using the second Q factor" (NO in step S1002), the processing of the power reception apparatus 101 proceeds to step S1007.

In step S1007, if the foregoing response is a NAK (YES in step S1007), the processing of the power reception apparatus 101 proceeds to step S1003, and if the foregoing response is not a NAK (NO in step S1007), the processing of the power reception apparatus 101 proceeds to step S1008.

In step S1008, the foregoing response is an ACK and the calibration data point is accepted. The power reception apparatus 101 ends the processing in the flowchart of FIG. 10.

In step S1003, the power reception apparatus 101 determines whether the foregoing response has been received A times in succession. If the foregoing response has not been received A times in succession (NO in step S1003), the power reception apparatus 101 proceeds to step S1006. If the foregoing response has been received A times in succession (YES in step S1003), the power reception apparatus 101 proceeds to step S1004.

In step S1006, the power reception apparatus 101 transmits the RP1 to the power transmission apparatus 100 again with the request bit set to "1", and the processing in the flowchart of FIG. 10 ends.

In step S1004, the power reception apparatus 101 determines that the calibration is failed, and the processing proceeds to step S1005. In step S1005, the power reception apparatus 101 limits the received power. For example, to limit the received power, the power reception apparatus 101 may transmit an EPT packet or reduce the power consumption of the load to a value greater than 0 (for example, 5 W). The power reception apparatus 101 ends the processing in the flowchart of FIG. 10.

As described above, the power transmission apparatus 100 wirelessly transmits power. In step S800, the third foreign object detection processing unit 405 functions as a reception unit and receives, from the power reception apparatus 101, the request bit to request that the Q factor be calculated and the received power value of the RP1.

In step S700, the second Q factor measurement unit 401 functions as a stop unit and stops the voltage applied to the power transmission coil 303. In step S705, the second Q factor measurement unit 401 functions as a calculation unit and calculates the Q factor based on a change in the electrical characteristic of the power transmission coil 303 over time during the stop. The electrical characteristic of the power transmission coil 303 refers to the voltage value of the power transmission coil 303.

In step S803, if the change in the electrical characteristic of the power transmission coil over time during the stop is monotonically decreasing, the processing of the third foreign object detection processing unit 405 proceeds to step S804. If the change in the electrical characteristic of the power transmission coil over time during the stop is not monotonically decreasing, the processing of the third foreign object detection processing unit 405 proceeds to step S808.

In steps S806 and S809, the third foreign object detection processing unit 405 functions as a transmission unit and transmits, to the power reception apparatus 101, a notification indicating whether to use the received power value of the RP1 for foreign object detection, based on the Q factor calculated in step S705.

In step S806, if the Q factor calculated in step S705 is greater than a first threshold, the third foreign object detection processing unit 405 transmits, to the power reception apparatus 101, an ACK indicating that the received power value of the RP1 is used for foreign object detection. This ACK indicates that the received power value of the RP1 is accepted as a calibration data point.

In step S809, if the Q factor calculated in step S705 is not greater than the first threshold, the third foreign object detection processing unit 405 transmits, to the power reception apparatus 101, a NAK indicating that the received power value of the RP1 is not used for foreign object detection. This NAK indicates that the received power value of the RP1 is not accepted as a calibration data point.

In step S808, the third foreign object detection processing unit 405 functions as a transmission unit and transmits, to the power reception apparatus 101, a notification indicating that whether to use the received power value of the RP1 for foreign object detection is not determined.

In step S810 of FIG. 8B, if the absolute value of the increased or decreased value CEV in the voltage value, which the power reception apparatus 101 requests from the power transmission apparatus 100, is less than or equal to a second threshold, the processing of the third foreign object detection processing unit 405 proceeds to step S801. If the absolute value of the increased or decreased value CEV in the voltage value, which the power reception apparatus 101 requests from the power transmission apparatus 100, is greater than the second threshold, the processing of the third foreign object detection processing unit 405 proceeds to step S809.

The power reception apparatus 101 wirelessly receives power. In step S800, the power reception apparatus 101 functions as a transmission unit and transmits, to the power transmission apparatus 100, the request bit to request that the Q factor be calculated based on a change in the electrical characteristic of the power transmission coil 303 over time and the received power value of the RP1.

In step S1001 of FIG. 10, the power reception apparatus 101 receives a response to the foregoing transmission. In step S1002, if the power reception apparatus 101 receives a notification response indicating that whether to use the received power value of the RP1 for foreign object detection is not determined based on the Q factor, the processing proceeds to step S1003.

In step S1006, the power reception apparatus 101 functions as a transmission unit and transmits, to the power transmission apparatus 100, the request bit to request that the Q factor be calculated based on a change in the electrical characteristic of the power transmission coil 303 over time and the received power value of the RP1 again.

In step S1005, the power reception apparatus 101 functions as a limitation unit and limits the received power if a notification response indicating that whether to use the received power value of the RP1 for foreign object detection is not determined based on the Q factor has been received a threshold number of times in succession.

Second Exemplary Embodiment

A second exemplary embodiment will be described. The voltage waveform of a power transmission coil 303 can include a plurality of frequency components. An operation of a second Q factor measurement unit 401 in such a case will be described with reference to FIGS. 11C, 12A, and 12B.

Figure 12A:
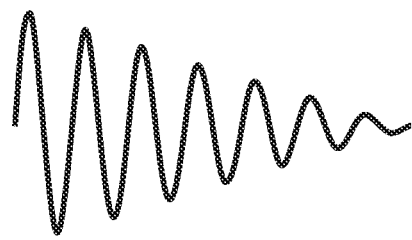
FIG. 12A is a diagram for describing a method for measuring a Q factor in a time domain.
Figure 12B:
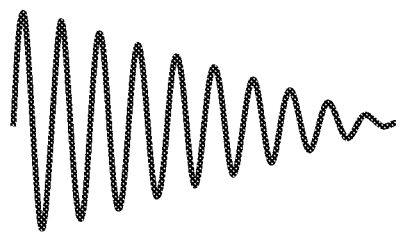
FIG. 12B is a diagram for describing a method for measuring a Q factor in a time domain.

In FIG. 11C, the voltage waveform of the power transmission coil 303 is not monotonically decreasing but this may be a case where monotonically decreasing voltage waveforms are superimposed. For example, FIG. 12A illustrates the voltage waveform of a frequency component of the voltage waveform of FIG. 11C at a resonant frequency of F1 when the power transmission coil 303 and a resonant capacitor 306 are short-circuited. FIG. 12B illustrates the voltage waveform of a frequency component of the voltage waveform of FIG. 11C at a resonant frequency of F2 when a power reception coil 201 and a resonant capacitor 207 are short-circuited.

Figure 7B:
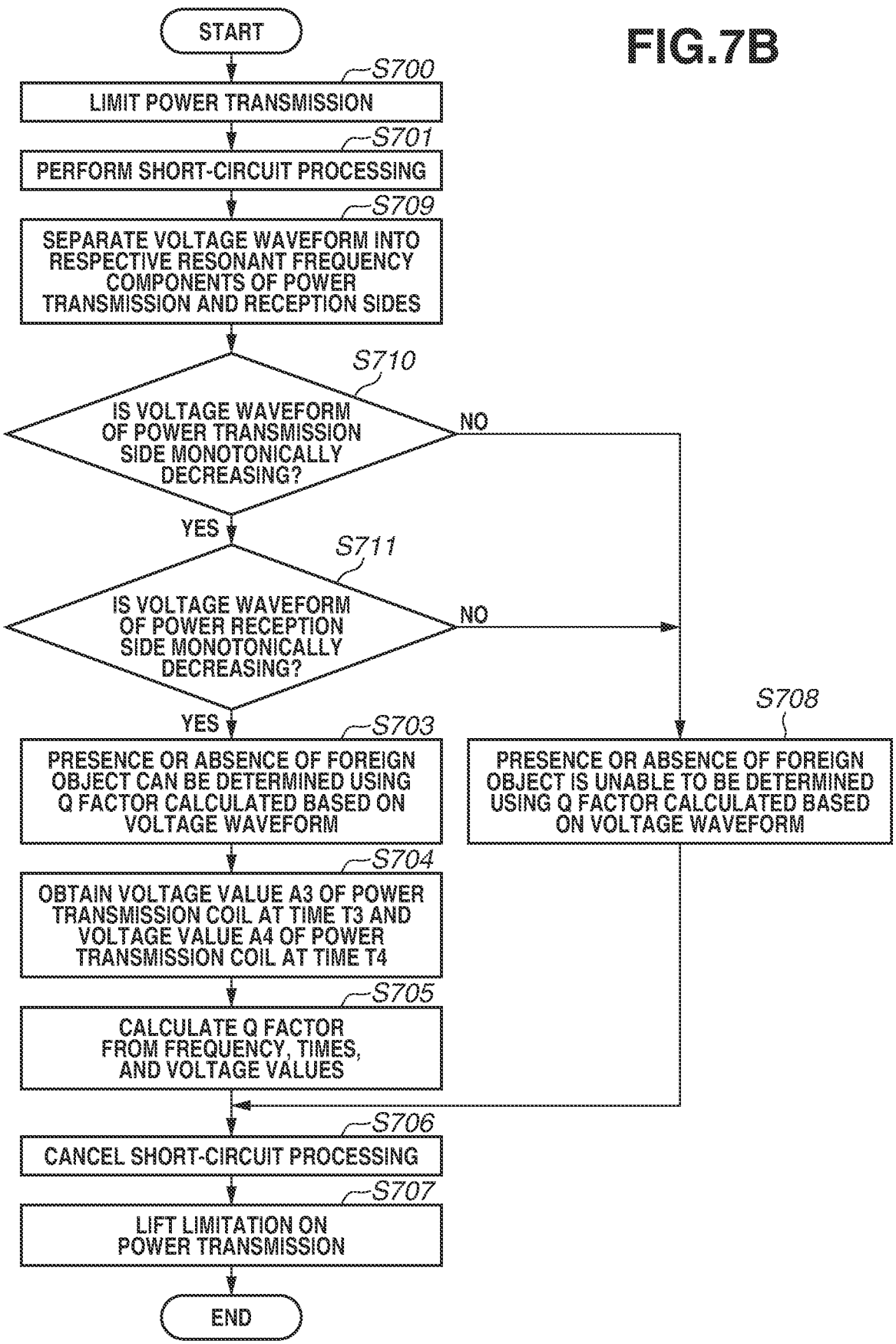
FIG. 7B is a flowchart of second Q factor measurement processing.

FIG. 7B is a flowchart illustrating processing performed by a second Q factor measurement unit 401 on the voltage waveforms of the frequency components at the resonant frequencies F1 and F2. In FIG. 7B, step S702 in FIG. 7A is deleted and steps S709 to S711 are added. Differences between the second exemplary embodiment and the first exemplary embodiment will now be described.

After step S701, the processing of the second Q factor measurement unit 401 proceeds to step S709. In step S709, the second Q factor measurement unit 401 separates the voltage waveform of the power transmission coil 303 of FIG. 11C into the frequency component at the resonant frequency F1 of the power transmission apparatus 100 in FIG. 12A and the frequency component at the resonant frequency F2 of the power reception apparatus 101 in FIG. 12B.

In step S710, the second Q factor measurement unit 401 determines whether the voltage waveform including the frequency component at the resonant frequency F1 of the power transmission apparatus 100 in FIG. 12A is monotonically decreasing. If the voltage waveform including the frequency component at the resonant frequency F1 is monotonically decreasing as in FIG. 12A (YES in step S710), the processing of the second Q factor measurement unit 401 proceeds to step S711. If the voltage waveform including the frequency component at the resonant frequency F1 is not monotonically decreasing (NO in step S710), the processing of the second Q factor measurement unit 401 proceeds to step S708.

In step S711, the second Q factor measurement unit 401 determines whether the voltage waveform including the frequency component at the resonant frequency F2 of the power reception apparatus 101 in FIG. 12B is monotonically decreasing. If the voltage waveform including the frequency component at the resonant frequency F2 is monotonically decreasing as in FIG. 12B (YES in step S711), the second Q factor measurement unit 401 proceeds to step S703. If the voltage waveform including the frequency component at the resonant frequency F2 is not monotonically decreasing (NO in step S711), the second Q factor measurement unit 401 proceeds to step S708.

In step S703, like FIG. 7A, the second Q factor measurement unit 401 determines that the presence or absence of a foreign object can be determined using the second Q factor calculated based on the voltage waveform. In step S708, like FIG. 7A, the second Q factor measurement unit 401 determines that the presence or absence of a foreign object is unable to be determined using the second Q factor calculated based on the voltage waveform.

As described above, the second Q factor measurement unit 401 separates the voltage waveform of the power transmission coil 303 into the frequency component at the resonant frequency F1 of the power transmission apparatus 100 and the frequency component at the resonant frequency F2 of the power reception apparatus 101. The second Q factor measurement unit 401 then determines whether the presence or absence of a foreign object can be determined, based on whether the voltage waveform including the frequency component at the resonant frequency F1 and the voltage waveform including the frequency component at the resonant frequency F2 are both monotonically decreasing. This enables the second Q factor measurement unit 401 to determine the presence or absence of a foreign object using the second Q factor even if a voltage waveform that appears to be not monotonically decreasing is observed like FIG. 11C.

In FIG. 7B, the second Q factor measurement unit 401 determines that the presence or absence of a foreign object can be determined if the voltage waveform including the frequency component at the resonant frequency F1 and the voltage waveform including the frequency component at the resonant frequency F2 are both monotonically decreasing; however, this is not restrictive. For example, if the voltage waveform including the frequency component at the resonant frequency F1 is monotonically decreasing, the second Q factor measurement unit 401 may determine that the presence or absence of a foreign object can be determined, regardless of the voltage waveform including the frequency component at the resonant frequency F2. Alternatively, if the voltage waveform including the frequency component at the resonant frequency F2 is monotonically decreasing, the second Q factor measurement unit 401 may determine that the presence or absence of a foreign object can be determined, regardless of the voltage waveform including the frequency component at the resonant frequency F1. The second Q factor measurement unit 401 may receive the resonant frequency F2 of the power reception apparatus 101 from the power reception apparatus 101.

When a power transmission unit 302 stops power transmission from time $T_0$ to time $T_5$ in FIG. 11B, the second Q factor measurement unit 401 measures the second Q factor once using two points 1104 and 1105. However, the second Q factor measurement unit 401 may measure the second Q factor a plurality of times using a plurality of points from time $T_0$ to time $T_5$. Specifically, the second Q factor measurement unit 401 may calculate the second Q factor a total of two times by using four points including points 1106 and 1107 in addition to the points 1104 and 1105, e.g., by using the points 1104 and 1107 and the points 1106 and 1105.

Figure 7C:
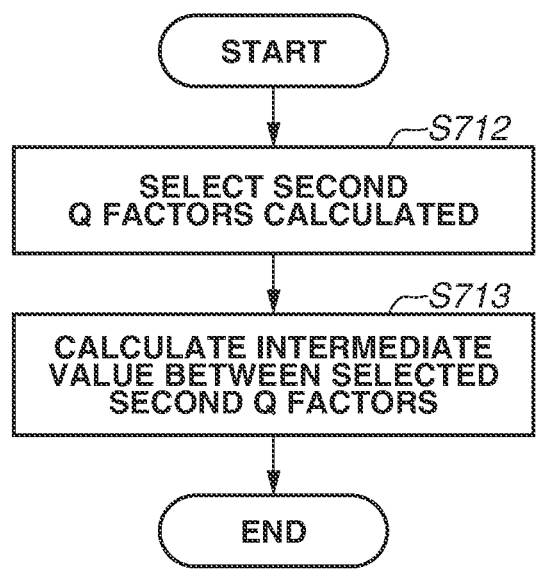
FIG. 7C is a flowchart of second Q factor measurement processing.

FIG. 7C is a flowchart illustrating an example of a method for determining the second Q factor in a case where the second Q factor is calculated a plurality of times. In step S712, the second Q factor measurement unit 401 selects the plurality of second Q factors calculated. In step S713, the second Q factor measurement unit 401 calculates an intermediate value of the plurality of second Q factors selected, and determines the intermediate value as the second Q factor. The second Q factor measurement unit 401 may determine the second Q factor using, as an alternative method, either one of or a combination of a method for averaging the plurality of second Q factors selected and a method for determining the Q factor by excluding outliers from the plurality of second Q factors.

In step S705, the second Q factor measurement unit 401 calculates a plurality of Q factors based on a plurality of points on the change in the electrical characteristic of the power transmission coil 303 over time during the stop. In steps S806 and S809, a third foreign object detection processing unit 405 transmits a notification indicating whether to use the received power value of the RP1 for foreign object detection to the power reception apparatus 101 based on the plurality of Q factors.

When the second Q factor measurement unit 401 receives the RP1, the power transmission unit 302 may stop and resume power transmission a plurality of times. In each of the cycles of the stop and resume of the power transmission, the second Q factor measurement unit 401 may perform the second Q factor measurement once or a plurality of times, and calculate the second Q factor based on the results of a plurality of cycles, using FIG. 7A or FIG. 7B and the configuration described above in each of the cycles. The second Q factor measurement unit 401 may then determine whether the presence or absence of a foreign object can thereby be determined. Specifically, the second Q factor measurement unit 401 may determine the second Q factor by using the foregoing methods for determining the second Q factor by calculating an intermediate value or an average or excluding outliers, or a combination thereof.

In step S700, the second Q factor measurement unit 401 stops and resumes the voltage applied to the power transmission coil 303 repeatedly a plurality of times. In step S705, the second Q factor measurement unit 401 calculates a plurality of Q factors based on changes in the electrical characteristic of the power transmission coil 303 over time during the plurality of stops. In step S806 and S809, the third foreign object detection processing unit 405 transmits, to the power reception apparatus, a notification indicating whether to use the received power value of the RP1 for foreign object detection based on the plurality of Q factors.

If the second Q factor measurement unit 401 performs the second Q factor measurement processing a plurality of times (N times) and determines that "the presence or absence of a foreign object is unable to be determined" at least once in the N times, the second Q factor measurement unit 401 may determine that "the presence or absence of a foreign object is unable to be determined" after the second Q factor measurement processing is performed N times. Alternatively, if the second Q factor measurement unit 401 determines that "the presence or absence of a foreign object can be determined" at least once in the N times, the second Q factor measurement unit 401 may determine that "the presence or absence of a foreign object can be determined" after the second Q factor measurement processing is performed N times. Alternatively, the second Q factor measurement unit 401 may set a threshold (for example, M times; M≤N) for the number of times that the determination that "the presence or absence of a foreign object is unable to be determined" is made, and, if the number of times that the determination that "the presence or absence of a foreign object is unable to be determined" is made exceeds M, the second Q factor measurement unit 401 may determine that "the presence or absence of a foreign object is unable to be determined". Conversely, the second Q factor measurement unit 401 may set a threshold (for example, M' times; M'≤N) for the number of times that the determination that "the presence or absence of a foreign object can be determined" is made, and, if the number of times that the determination that "the presence or absence of a foreign object can be determined" is made exceeds M', the second Q factor measurement unit 401 may determine that "the presence or absence of a foreign object can be determined".

In step S808 of FIG. 8A, the third foreign object detection processing unit 405 is described to transmit the data indicating that the presence or absence of a foreign object is unable to be determined using the second Q factor calculated based on the voltage waveform; however, this is not restrictive. The third foreign object detection processing unit 405 may transmit data indicating that whether to accept the received power value stored in the RP1(FOD) and the transmitted power value of the power transmission apparatus 100 when the received power value is obtained as a calibration data point is unable to be determined.

In step S810 of FIG. 8B, the third foreign object detection processing unit 405 determines whether the voltage value of the power transmission coil 303 is stable. This determination may be made based on whether the value of the CEV is near "0", or by actually observing whether the voltage value of the power transmission coil 303 is stable.

In the present exemplary embodiment, the power transmission apparatus 100 is described to measure the second Q factor. However, the second Q factor measurement unit 501 (FIG. 5) of the power reception apparatus 101 may measure the second Q factor. Specifically, the second Q factor measurement unit 501 may perform the processing in FIG. 7A or 7B, and the third foreign object detection processing unit 500 may perform the processing of FIG. 8A or 8B. Here, the power reception apparatus 101 may receive information about the resonant frequency F1 of the power transmission apparatus 100 from the power transmission apparatus 100. In step S808, the power transmission apparatus 100 is described to transmit the data indicating that the determination is unable to be made. This data has two meanings. One is that, if the power transmission apparatus 100 performs the second Q factor measurement a plurality of times and makes the determination based on the results of the plurality of second Q factor measurements, the data is transmitted to indicate that the presence or absence of a foreign object is determined at the last second Q factor measurement and is thus unable to be determined (not determined) at other than the last second Q factor measurement. The other is that, if the power transmission apparatus 100 performs the second Q factor measurement once and makes the determination based on the result of the single second Q factor measurement, the second Q factor is unable to be calculated because the voltage wavelength of the power transmission coil 303 is not monotonically decreasing. To distinguish between the two meanings, the power transmission apparatus 100 may transmit different pieces of data for the two respective meanings. Specifically, if the power transmission apparatus 100 makes the determination based on the results of a plurality of second Q factor measurements, the power transmission apparatus 100 transmits data indicating that the determination is unable to be determined (the determination is not made) at other than the last second Q factor measurement. If the power transmission apparatus 100 makes the determination based on the result of a single Q factor measurement and the voltage waveform of the power transmission coil 303 is not monotonically decreasing, the power transmission apparatus 100 may transmit that the second Q factor is unable to be calculated (Not Calculated (NC)). This enables more precise control.

In the present exemplary embodiment, the second Q factor measurement unit 401 and the third foreign object detection processing unit 405 determine whether the presence or absence of a foreign object can be determined using the second Q factor; however, this is not restrictive. The second Q factor measurement unit 401 and the third foreign object detection processing unit 405 may determine the presence probability of a foreign object (Presence Probability).

The description has been given of the case in which the third foreign object detection processing unit 405 receives the RP1 in step S800; however, the third foreign object detection processing unit 405 may receive either one of the RP2 and RP0.

The second Q factor measurement unit 401 according to the present exemplary embodiment determines that the presence or absence of a foreign object is unable to be determined using the second Q factor, based on whether the voltage waveform of the power transmission coil 303 is monotonically decreasing; however, this is not restrictive. The second Q factor measurement unit 401 may actually measure the second Q factor and makes the determination based on the result. Specifically, for example, as described with reference to FIG. 11B, the second Q factor measurement unit 401 calculates the second Q factor a plurality of times using a plurality of points while the power transmission unit 302 stops power transmission from time $T_0$ to time $T_5$. If the plurality of calculation results falls within a certain range, the second Q factor measurement unit 401 may determine that the presence or absence of a foreign object can be determined using the second Q factor, and if not, the second Q factor measurement unit 401 may determine that the presence or absence of a foreign object is unable to be determined using the second Q factor.

Alternatively, if the second Q factor measurement unit 401 performs the second Q factor measurement processing a plurality of times (N times) and makes the foregoing determination, the second Q factor measurement unit 401 actually calculates the second Q factor N times. If the plurality of calculation results falls within a certain range, the second Q factor measurement unit 401 may determine that the presence or absence of a foreign object can be determined using the second Q factors, and if not, the second Q factor measurement unit 401 may determine that the presence or absence of a foreign object is unable to be determined using the second Q factors.

As described above, in step S709 of FIG. 7B, the second Q factor measurement unit 401 separates the change in the electrical characteristic of the power transmission coil 303 over time during the stop into two or more frequency components. If a change in the electrical characteristic over time including at least one of the separated frequency components is monotonically decreasing, the processing of the second Q factor measurement unit 401 proceeds to step S703. If none of the changes in the electrical characteristic over time including the respective separated frequency components is monotonically decreasing, the processing of the second Q factor measurement unit 401 proceeds to step S708.

Other Exemplary Embodiments

The present disclosure can also be implemented by processing for supplying a program for implementing one or more functions of the foregoing exemplary embodiments to a system or an apparatus via a network or a storage medium, and reading and executing the program by one or more processors in a computer of the system or apparatus. A circuit for implementing one or more functions (such as an application-specific integrated circuit (ASIC)) can also be used for implementation.

At least part of the processing illustrated in the foregoing flowcharts may be implemented by hardware. In the case where the processing implemented by hardware, for example, a predetermined complier can be used to automatically generate a dedicated circuit on an FPGA from the programs for implementing the steps. FPGA is an abbreviation for field programmable gate array. Like an FPGA, a gate array circuit may be formed and implemented as hardware.

The power transmission apparatus and the power reception apparatus may be image input apparatuses such as an imaging apparatus (camera or video camera) and a scanner, or image output apparatuses such as a printer, a copying machine, and a projector, for example. Further, the power transmission apparatus and the power reception apparatus may be storage devices such as a hard disk device and a memory device, or information processing apparatuses such as a personal computer (PC) and a smartphone.

The power reception apparatus according to the present disclosure may be an information terminal device. For example, the information terminal device includes a display unit (display) that is supplied with power received from a power reception antenna and displays information to the user. The power received from the power reception antenna is stored in a storage unit (battery), and power is supplied from the battery to the display unit. In such a case, the power reception apparatus may include a communication unit that communicates with another apparatus different from the power transmission apparatus. The communication unit may support communication standards such as NFC communication and the fifth generation mobile communication system (5G).

The power reception apparatus according to the present disclosure may be a vehicle such as an automobile. For example, an automobile, which is the power reception apparatus, may receive power from a charger (power transmission apparatus) via a power transmission antenna installed in a parking lot. The automobile, which is the power reception apparatus, may receive power from the charger (power transmission apparatus) via a power transmission antenna buried in a road. Such an automobile supplies the received power to its battery. The power of the battery may be supplied to an engine unit (motor or motor drive unit) for driving wheels, or may be used to drive sensors used for driving assistance or drive a communication unit for communicating with an external device. That is, in such a case, the power reception apparatus may include the wheels, the battery, the motor and sensors to be driven with the received power, and the communication unit for communicating with devices other than the power transmission apparatus. The power reception apparatus may further include an accommodation unit for accommodating people. Examples of the sensors include sensors used to measure distances to vehicles and other obstacles. The communication unit may support the Global Positioning System or Global Positioning Satellite (GPS), for example. The communication unit may also support communication standards such as the fifth generation mobile communication system (5G). Examples of the vehicle may include a bicycle and a motorcycle.

The power reception apparatus according to the present disclosure may be a power tool or a home appliance. These devices, which are the power reception apparatus, may include a battery and a motor to be driven with the received power stored in the battery. These devices may include a notification unit that issues a notification of the remaining battery level. These devices may also include a communication unit that communicates with another device different from the power transmission apparatus. The communication unit may support communication standards such as NFC and the fifth generation mobile communication system (5G).

The power transmission apparatus according to the present disclosure may be an in-vehicle charger that transmits power to a portable information terminal device such as a smartphone and a tablet supporting wireless power transfer in an automobile. Such an in-vehicle charger may be installed at any position inside the automobile. For example, the in-vehicle charger may be installed on the console of the automobile, on the instrument panel (dashboard), at a position between passenger seats, on the ceiling, or on a door. Installation at a location that may interfere with driving is, however, undesirable. While the description has been given of the example where the power transmission apparatus is an in-vehicle charger, such a charger is not limited to one installed in a vehicle, and may be installed in transport machinery such as a train, an aircraft, and a ship. In such a case, the charger may also be installed at a position between passenger seats, on the ceiling, or on a door.

A vehicle, such as an automobile, including an in-vehicle charger may be the power transmission apparatus. In such a case, the power transmission apparatus includes wheels and a battery, and supplies power to the power reception apparatus via a power transmission circuit unit and a power transmission coil using the battery power.

All the foregoing exemplary embodiments only demonstrate specific examples in carrying out the present disclosure, and the technical scope of the present disclosure is not interpreted by the exemplary embodiments in a limited manner. In other words, the present disclosure can be practiced in various forms without departing from the technical concept or main features thereof.

The present invention is not limited to the foregoing exemplary embodiments, and various changes and modifications can be made without departing from the spirit or scope of the present invention. The following claims are therefore appended to make the scope of the present invention public.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, a power transmission apparatus can detect an object different from a power reception apparatus with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power transmission apparatus, comprising:
   a reception unit configured to receive a request to calculate a quality factor (Q factor) and a received power value from a power reception apparatus;
   a stop unit configured to stop a voltage applied to a power transmission coil;
   a calculation unit configured to calculate the Q factor based on a change in an electrical characteristic of the power transmission coil over time during a stop; and
   a transmission unit configured to, if the change in the electrical characteristic of the power transmission coil over time during the stop is monotonically decreasing, transmit, to the power reception apparatus, a notification indicating whether to use the received power value to detect a foreign object based on the calculated Q factor, and if the change in the electrical characteristic of the power transmission coil over time during the stop is not monotonically decreasing, transmit, to the power reception apparatus, a notification indicating that whether to use the received power value to detect the foreign object is not determined.

2. The power transmission apparatus according to claim 1, wherein the transmission unit is configured to transmit, if the calculated Q factor is greater than a first threshold, a notification indicating that the received power value is used to detect the foreign object, and transmit, if the calculated Q factor is not greater than the first threshold, a notification indicating that the received power value is not used to detect the foreign object.

3. The power transmission apparatus according to claim 1, wherein the transmission unit is configured to transmit, if an absolute value of an increased or decreased value in a voltage value that the power reception apparatus requests from the power transmission apparatus is less than or equal to a second threshold and the change in the electrical characteristic of the power transmission coil over time during the stop is monotonically decreasing, the notification indicating whether to use the received power value to detect the foreign object based on the Q calculated factor, and transmit, if the absolute value of the increased or decreased value in the voltage value that the power reception apparatus requests from the power transmission apparatus is less than or equal to the second threshold and the change in the electrical characteristic of the power transmission coil over time during the stop is not monotonically decreasing, the notification indicating that whether to use the received power value to detect the foreign object is not determined.

4. The power transmission apparatus according to claim 3, wherein the transmission unit is configured to transmit, if the absolute value of the increased or decreased value in the voltage value that the power reception apparatus requests from the power transmission apparatus is greater than the second threshold, the notification indicating that the received power value is not used to detect the foreign object.

5. The power transmission apparatus according to claim 1, wherein the transmission unit is configured to transmit, if the change in the electrical characteristic of the power transmission coil over time during the stop is separated into two or more frequency components and if a change in the electrical characteristic over time including at least one of the separated frequency components is monotonically decreasing, the notification indicating whether to use the received power value to detect the object based on the calculated Q factor, and transmits, if the change in the electrical characteristic of the power transmission coil over time during the stop is separated into two or more frequency components and if none of changes in the electrical characteristic over time including the respective separated frequency components is monotonically decreasing, the notification indicating that whether to use the received power value to detect the foreign object is not determined.

6. The power transmission apparatus according to claim 1, wherein the calculation unit is configured to calculate a plurality of Q factors based on a plurality of points on the change in the electrical characteristic of the power transmission coil over time during the stop, and wherein the transmission unit is configured to transmit, to the power reception apparatus, the notification indicating whether to use the received power value to detect the foreign object based on the plurality of Q factors.

7. The power transmission apparatus according to claim 1, wherein the stop unit is configured to stop and resume the voltage applied to the power transmission coil repeatedly a plurality of times, wherein the calculation unit is configured to calculate a plurality of Q factors based on changes in the electrical characteristic of the power transmission coil over time during a plurality of stops, and wherein the transmission unit is configured to transmit, to the power reception apparatus, the notification indicating whether to use the received power value to detect the foreign object based on the plurality of Q factors.

8. The power transmission apparatus according to claim 1, wherein whether to use the received power value to detect the object indicates whether to accept the received power value as a calibration data point.

9. The power transmission apparatus according to claim 1, wherein the electrical characteristic of the power transmission coil is a voltage value of the power transmission coil.

10. The power transmission apparatus according to claim 1, further comprising a wheel and a battery, wherein the power transmission apparatus is configured to wirelessly transmit the power to the power reception apparatus using power of the battery.

11. The power transmission apparatus according to claim 1, wherein the power transmission apparatus is installed in a vehicle.

12. A power reception apparatus, comprising:
    A power receiving unit configured to wireless receive power; and
    a transmission unit configured to transmit, to a power transmission apparatus, a request to calculate a Q factor based on a change in an electrical characteristic of a power transmission coil over time and a received power value,
    wherein the transmission unit is configured to transmit, to the power transmission apparatus, if a notification response indicating that whether to use the received power value to detect a foreign object is not determined based on the Q factor is received as a response to the transmission, the request to calculate the Q factor based on the change in the electrical characteristic of the power transmission coil over time and a received power value again.

13. The power reception apparatus according to claim 12, further comprising a limitation unit configured to limit received power if the notification response indicating that whether to use the received power value to detect the foreign object is not determined based on the Q factor is received as the response to the transmission a threshold number of times in succession.

14. The power reception apparatus according to claim 12, further comprising:
- a battery configured to store power received by a power reception unit; and
- a motor configured to drive a wheel using the power of the battery.

15. The power reception apparatus according to claim 12, further comprising:
- a battery configured to store power received by a power reception unit; and
- a display unit to which the power of the battery is supplied.

16. The power reception apparatus according to claim 12, further comprising:
- a battery configured to store power received by a power reception unit; and
- a notification unit configured to represent a notification of a remaining level of the battery.

17. A method for a power transmission apparatus, the method comprising:
- receiving a request to calculate a Q factor and a received power value from a power reception apparatus;
- stopping a voltage applied to a power transmission coil;
- calculating the Q factor based on a change in an electrical characteristic of the power transmission coil over time during a stop; and
- if the change in the electrical characteristic of the power transmission coil over time during the stop is monotonically decreasing, transmitting, to the power reception apparatus, a notification indicating whether to use the received power value to detect a foreign object based on the calculated Q factor, and if the change in the electrical characteristic of the power transmission coil over time during the stop is not monotonically decreasing, transmitting, to the power reception apparatus, a notification that whether to use the received power value to detect the foreign object is not determined.

18. A method for a power reception apparatus, the method comprising:
- transmitting a request to calculate a Q factor based on a change in an electrical characteristic of a power transmission coil over time and a received power value to a power transmission apparatus; and
- if a notification response indicating that whether to use the received power value to detect a foreign object is not determined based on the Q factor is received as a response to the transmitting, transmitting, to the power transmission apparatus, the request to calculate the Q factor based on the change in the electrical characteristic of the power transmission coil over time and a received power value again.

19. A non-transitory computer-readable storage medium storing a program for causing a computer to execute a method for a power transmission apparatus, the method comprising:
- receiving a request to calculate a Q factor and a received power value from a power reception apparatus;
- stopping a voltage applied to a power transmission coil;
- calculating the Q factor based on a change in an electrical characteristic of the power transmission coil over time during a stop; and
- if the change in the electrical characteristic of the power transmission coil over time during the stop is monotonically decreasing, transmitting, to the power reception apparatus, a notification indicating whether to use the received power value to detect a foreign object based on the calculated Q factor, and if the change in the electrical characteristic of the power transmission coil over time during the stop is not monotonically decreasing, transmitting, to the power reception apparatus, a notification that whether to use the received power value to detect the foreign object is not determined.

20. A non-transitory computer-readable storage medium storing a program for causing a computer to execute a method for a power reception apparatus, the method comprising:
- transmitting a request to calculate a Q factor based on a change in an electrical characteristic of a power transmission coil over time and a received power value to a power transmission apparatus; and
- if a notification response indicating that whether to use the received power value to detect a foreign object is not determined based on the Q factor is received as a response to the transmitting, transmitting, to the power transmission apparatus, the request to calculate the Q factor based on the change in the electrical characteristic of the power transmission coil over time and a received power value again.

* * * * *